(12) United States Patent
Freeman

(10) Patent No.: US 7,392,174 B2
(45) Date of Patent: Jun. 24, 2008

(54) NATURAL-LANGUAGE PROCESSING SYSTEM USING A LARGE CORPUS

(76) Inventor: Robert J. Freeman, 9 Ocean View Terrace, Sumner, Christchurch (NZ) 8006

( * ) Notice: Subject to any disclaimer, the term of this patent is extended or adjusted under 35 U.S.C. 154(b) by 678 days.

(21) Appl. No.: 10/239,455

(22) PCT Filed: Mar. 20, 2001

(86) PCT No.: PCT/IB01/00678

§ 371 (c)(1),
(2), (4) Date: Sep. 20, 2002

(87) PCT Pub. No.: WO01/71448

PCT Pub. Date: Sep. 27, 2001

(65) Prior Publication Data

US 2004/0024583 A1    Feb. 5, 2004

(51) Int. Cl.
*G06F 17/27* (2006.01)
(52) U.S. Cl. ..................... 704/9; 704/1; 704/4
(58) Field of Classification Search ............... 704/1, 704/4, 9

See application file for complete search history.

(56) References Cited

U.S. PATENT DOCUMENTS

| | | | | |
|---|---|---|---|---|
| 5,384,893 | A * | 1/1995 | Hutchins | 704/267 |
| 5,477,450 | A * | 12/1995 | Takeda et al. | 704/2 |
| 5,675,819 | A | 10/1997 | Schuetze | |
| 5,680,511 | A * | 10/1997 | Baker et al. | 704/257 |
| 5,963,940 | A * | 10/1999 | Liddy et al. | 707/5 |
| 5,995,930 | A * | 11/1999 | Hab-Umbach et al. | 704/254 |
| 6,006,221 | A * | 12/1999 | Liddy et al. | 707/5 |
| 6,026,388 | A * | 2/2000 | Liddy et al. | 707/1 |
| 6,173,261 | B1 | 1/2001 | Arai et al. | |
| 6,622,123 | B1 * | 9/2003 | Chanod et al. | 704/277 |
| 6,871,174 | B1 * | 3/2005 | Dolan et al. | 704/9 |
| 2003/0167162 | A1 * | 9/2003 | Simpson et al. | 704/9 |

OTHER PUBLICATIONS

Freeman, R. "Example-based complexity-syntax and semantics as the production of ad-hoc arrangements of examples," NAACL-ANLP 2000 Workshop: Syntactic and Semantic Complexity in Natural Language Processing Systems, Apr. 30, 2000, Association for Computational Linguistics, pp. 47-50.*

Fujimoto, et al., "Clustering, verb, adjective, adjectival-verb concepts using proximity relation," Proceedings of the 6th IEEE International Conference on Fuzzy Systems, Jul. 1-5, 1997, pp. 231-234, vol.1.*

(Continued)

*Primary Examiner*—David R. Hudspeth
*Assistant Examiner*—Eunice Ng

(57) ABSTRACT

A computer-parsing system using vectors (lists) to represent natural-language elements, providing a robust, distributed way to score grammaticality of an input string by using as a source material a large corpus of natural-language text. The system uses recombining of asymmetric associations of syntactically similar strings to form the vectors. The system uses equivalence lists for subparts of the string to build equivalence lists for longer strings in an order controlled by the potential parse to be scored. The power of recombination of vector elements in building longer strings provides a means of representing collocational complexity. Grammaticality scoring is based upon the number and similarity of the vector elements.

24 Claims, 18 Drawing Sheets

OTHER PUBLICATIONS

Weeds, et al. "The distributional similarity of sub-parses," Proceedings of the ACL Workshop on Empirical Modeling of Semantic Equivalence and Entailment, pp. 7-12, Ann Arbor, Jun. 2005, Association for Computational Linguistics.*

Grefenstette, G. "Use of syntactic context to produce term association lists for text retrieval," SIGIR '92, 15th International ACMISIGIR Conference on R&D in Informationa Retrieval, Copenhagen, Denamrk, pp. 89-97, Jun. 1992.*

Scha, et al. "A memory-based model of syntactic analysis: data-oriented parsing," Journal of Experimental & Theoretical Artificial Intelligence (Speical Issue on Memory-Based Language Processing), Jul. 1999, pp. 409-440.*

Similarity-Based Models of Word Cooccurrence Probabilities, Ido Dagan, Lillian Lee, Fernando C. N. Pereira, Machine Learning, 34, 43-69 (1999).

Dekang Lin, An Information-Theoretic Definition of Similarity, Proceedings of International Conference on Machine Learning, Madison, Wis. (Jul. 1998).

* cited by examiner

Pseudocode for the example code given below can be written:

open the table of word and word group equivalents--"INDEX_TABLE"

open the file which associates words with positions and put it in an array (used for debugging information only)

open table of word frequencies and put it in an array (used in scoring only)

definition of PAIR function (simply controls the search over possible pairing orders):

if there is only one element left in the array "this_string" (a sequence of pairs is finished)

add up all the entries from the last MATCH into "score" (note sum not average)
    print out "this_string" and "score"

else (continue to calculate "classes" for pairs of elements in the string)

for all the elements of "this_string" "i"

for all the elements of "this_string" less than "i"
        push the element onto an array "next_string"

call function REDUCE on "i"th and "i+1"th elements of "this_string"
        ...and put the result in the "i"th entry of "next_string"

for all the elements of "this_string" greater than "i+2"
        push these elements onto the array "next_string" too (this leaves you with the original string except for a merged "i"th element call PAIR again (recursively) on that string (PAIR will cycle through the whole original string, merging the "i" and
    "i+1"th elements, and, for each of these, all the pairs in each successively
    shortened string itself)

(Essentially, depth first, redundant, in this prototype, search over all pairings)

FIG. 3A-1 end of PAIR function definition of REDUCE function (just provides a place to make labels for new strings)

set string "phrase" to string value of new pairing
   call function MATCH on elements of this pairing
   set "phrase"th value of "INDEX_TABLE" to result of MATCH
   return string "phrase" and result of MATCH (for scoring, if necessary)

end of REDUCE function definition of MATCH function (actual match--here implemented as a "shifted reverse hash lookup". Match uses "position numbers" for constituent words rather than the words themselves-for speed)

map integer part (the word position info.) of INDEX_TABLE entry for first word of new pairing onto a new temporary hash keyed on that word position for each word position in the INDEX_TABLE entry for the second word look up the new temporary hash value - 1 push any lookups which are defined onto result list "res" (these are position numbers for the second word which are 1 number shifted fromthe first word, i.e. position matches)

call ADD_INDICIES function for list of position matches "res"

return new index entry (output of ADD_INDICIES)

end of MATCH function definition of ADD_INDICIES function (makes new "resonance" table entry from other entries)

for each match in the list of position matches in "res"

split entry into interger part (position info.) and decimal part (score info.)

lookup INDEX_TABLE entry corresponding to this match position

FIG. 3A-2

```
    for each item in this entry modify its basic equivalent score with the match score
(between two words)

take the temporary hash to store the new entry--
"match_indicies" and...
        if there is already an entry for this word position in the new
entry (i.e. if another match in "res" had an equivalent word with
this position)

add the modified score to the existing score (cumulative
scores)

else make an entry for this word position and give it the
modified score return total score, but _implicitly_ return new INDEX_TABLE entry
(in "match_indicies")

end of ADD_INDICIES function

MAIN body prompt the user
read the input string into an array "string"
normalize it to lower case
check to see that all the words in "string" have INDEX_TABLE
entries
call function PAIR to start making pairs and calculating
equivalents for "string"

end
```

FIG. 3A-3

A commented Perl 5 embodiment of the main parsing program is:
(code for dumping a diagramatic tree structure present but
commented out)

```perl
#!/usr/bin/perl -w
#Synthesizes lists of equivalents in an index for unkown word
pairs
#based on the lists of equivalents for word pairs we do have in
the index.

use DB_File; #for the index file, which is too big for RAM
use Fcntl;
use strict;
use Data::Dumper;
use vars qw($debug %INDEXT @pair_list @wd_line %wd_freq @tree);

#%INDEXT (Index Table) is the main data file
#words are stored as position numbers for efficient searching

#@pair_list--enables us to find words from position numbers

#@wd_line is a dummy
#%wd_freq stores word frequencies for scoring
#@tree stores sequence of pairings in a tree if we want to print
it out.

$debug = 1;

tie %INDEXT, 'DB_File', 'optINDEX_TABLE.db', O_CREAT|O_RDWR, 0640
or die "Can't open INDEX_TABLE.db: $!\n";

open PAIRS_IN, "<pair_list" or die "Can't read pair list\n";

while(<PAIRS_IN>) { #just reading in pairs for "word-to-position"
lookup
   chop;
   push @pair_list, $_;
} open WD_FREQS, "<ge5wdfreqs" or die "Can't read ge5wdfreqs\n";

while(<WD_FREQS>) { #reading in word frequency table--for scoring
   @wd_line = split(" ");
   $wd_freq{$wd_line[0]} = $wd_line[1];
} sub numerically { $a <=> $b; } #suroutine for numerical sorting
```

FIG. 3B-1

```perl
sub PAIR { #outer loop--lists all pairings of string--roughly...
  my ($current_node,@this_string) = @_;
  my $new_leaf; #new leaf returned from REDUCE each time my @next_string = "";
  my $i = 0;
  my $j = 0;
  my $score;
  my @parse_match_list;
  my $entry;
  my $calculated_equivalents;

my @equivs; #dummy to hold equivalents for each word if($#this_string == 0) { #partial end condition--bottom of one pairing branch
     $score = 0;
     @parse_match_list = split " ", $INDEXT{$this_string[0]};
     foreach $entry (@parse_match_list) {
        $score = $score + 10 * ($entry - int $entry);
     }
     printf ("Parsed: %s, score: %f\n", $this_string[0], $score);
  }
  else {
  #make a new string by pushing leading elements, combining, pushing trailing
     #"REDUCE" every pair in the string at each level (i.e. for each pair call)
     for($i=0;$i<$#this_string;$i++) {
        #push leading...
        for($j=0;$j<$i;$j++) {
           push @next_string, $this_string[$j];

#add this string element to parse tree
           @equivs = split " ", $INDEXT{$this_string[$j]};
           push @$current_node, ($this_string[$j]." - ".$#equivs." equivalents");

}
        #combine...
        ($new_leaf,$next_string[$i],$calculated_equivalents) = &REDUCE($this_string[$i],$this_string[$i+1]); #returns a new leaf for each REDUCE operation at each level add this string element to parse tree
        push @$current_node, ($next_string[$i]." - ".$calculated_equivalents." equivalents found from mixes");

for($j=$i+2;$j<=$#this_string;$j++) {
```

FIG. 3B-2

```
            #push trailing.
            push @next_string, $this_string[$j]; #was problem with
pushing ""

#add this string element to parse tree
            @equivs = split " ", $INDEX{$this_string[$j]};
            push @$current_node, ($this_string[$j]." - ".$#equivs."
equivalents");

} the current string is pushed as a leaf onto the last.
        push @$current_node, ($new_leaf);

&PAIR($new_leaf,@next_string);
        undef @next_string; #need this undef even with "my".
      }
    }
} sub REDUCE { #bit empty--just makes a label and calls MATCH my ($head,$pred) = @_;
  my $phrase = "\($head $pred\)";
  my @match_array; #array of equivalents for phrase
  my @new_leaf;
  my $calculated_equivalents;

@match_array = &MATCH($head,$pred);
  $calculated_equivalents = $#match_array;
  $INDEX{$phrase} = "@match_array"; #must cast to string for dbm
hash return(\@new_leaf,$phrase,$calculated_equivalents);

} sub MATCH { #searches over equivalents of first and second word to
synthesize index entry for new pair my ($head, $pred) = @_;
  my %match_indicies; #key variable--synthesized indicies of new
entry
  my %match_patterns;
  my $match_total = 0;

my $total_match_score = 0;
  my @match_stats;
```

FIG. 3B-3

```perl
   my $next_p_entry;
   my $next_h_entry;
   my $position;
   my $matched_word;
   my %word_list;
   my @key_list;

my @return_matrix;

my @head_pos = split " ", $INDEX{$head}; # digging entries out
of flat dbm format
   my @pred_pos = split " ", $INDEX{$pred};

my $element;

# this is where the actual match takes place...
   my %tmphash;
   @tmphash{map{int $_} @head_pos} = @head_pos;
   my @res;
   foreach (@pred_pos) {
      if (defined $tmphash{int($_)-1}) {
         push @res, [$tmphash{int($_)-1},$_];
      }
   } # reads the indicies of words in position one into a hash and
then looks up positions
   # of words in position two - 1 from it.

#now we've found matches, synthezise new entries using their
indicies

# %match_indicies is where the new entry is stored
   @match_stats =
&ADD_INDICIES(\@res,$head,$pred,\%match_indicies,\%match_patterns)
;
   $total_match_score = $match_stats[0]; #debug stats
   $match_total = $match_stats[1]; #debug stats push the synthesized hash into a flat entry to fit my flat dbm
format
   foreach $position (sort numerically keys %match_indicies) {
      push @return_matrix, ($position +
($match_indicies{$position}/10));

$matched_word = $pair_list[$position]; #next 3 lines just for
debugging
      ${ $word_list{$matched_word} }[0] =
$match_indicies{$position};
      ${ $word_list{$matched_word} }[1] =
$match_patterns{$position};
```

FIG. 3B-4

```
  } if ($debug == 1) {
  #BEGIN SOME DEBUG STUFF

@key_list = sort keys %word_list;
    print optOUTFILE "number of entries recorded in key_list is
$#key_list\n";
    print optOUTFILE "size of returned matrix will be
$#return_matrix\n";
    foreach $matched_word (@key_list) {
       printf optOUTFILE ("derived equivalent of \(%10s %10s\) is:
\"%10s\" with score %f %s\n", $head, $pred, $matched_word, ${
$word_list{$matched_word} }[0], ${ $word_list{$matched_word}
}[1]);
    } print optOUTFILE "\n\n";
printf ("total number of matches for  \"$head $pred\": %d\n",
$match_total);
#    printf ("total of freq. adjusted match scores for  \"$head
$pred\": %f\n", $total_match_score);
#    print "number of derived equivalents for \"$head $pred\"
$#key_list\n";

#END DEBUG STUFF
  } return(@return_matrix); #flat array for new index entry returned
to REDUCE
} sub ADD_INDICIES { #adds indicies from each MATCHed pair to new
entry my ($res,$head,$pred,$match_indicies,$match_patterns) = @_;

my $element;
  my $total_match_score = 0;
  my $match_total = 0;

my $next_h;
  my $next_p;
  my $next_h_score;
  my $next_p_score;

my $head_word; #words found from position in text
  my $pred_word;
```

FIG. 3B-5

```perl
  my $match_phrase;
  my $mi;
  my $match_score;
  my @this_match_list; # list of equivalents of the matching pair
  my $entry; # one entry for this list my $index; #index element holder
  my $score; #score element holder my $new_score; #convolution of element score and
this_match_score
  my $look_up;

foreach $element (@$res) { #for each match in the list of
matches get position from integer part and score from decimal part
of entry
    $next_h = int $$element[0];
    $next_p = int $$element[1];
    $next_h_score = 10 * ($$element[0] - $next_h);
    $next_p_score = 10 * ($$element[1] - $next_p);

# synthesize lookup key for new match from position info.
    $head_word = $pair_list[$next_h]; #words found from position
in text
    $pred_word = $pair_list[$next_p];

$match_phrase = "$head_word&$pred_word"; #key to lookup index calculate new score value for this match
    $mi =
$wd_freq{$match_phrase}/($wd_freq{$head_word}*$wd_freq{$pred_word}
);
    $match_score = 10000*$mi*$next_h_score*$next_p_score;

# more debugging info.
    printf optOUTFILE ("matched pair for %10s %10s: %10s\#%f
%10s\#%f match freq: %d match score: %f\n", $head, $pred,
$head_word, $next_h_score, $pred_word, $next_p_score,
$wd_freq{$match_phrase}, $match_score);

# key used to lookup match here then its indicies are jammed
in new entry (%match_indicies)
    if(defined($look_up = $INDEX{$match_phrase})) { #block
undefined lookups
      @this_match_list = split " ", $look_up; #penalty because of
my flat index format here...
```

FIG. 3B-6

```
        foreach $entry (@this_match_list) { #for each item in each
matches entry very time consuming--score update for each item of each
match... do later??
        $index = int $entry;
        $score = 10 * ($entry - $index); #score coded in decimal
part
        $new_score = $match_score*$score; #new_score is now a
proportion of old if(defined $$match_indicies{$index}) { try this--extra info should add to the strength, not
subtract
          $$match_indicies{$index} = $$match_indicies{$index} +
$new_score;

#adds matching pattern to match_patterns for debugging
          #keep all pairings which contribute evidence for an
equivalent
          $$match_patterns{$index} =
$$match_patterns{$index}."\#".$match_phrase;

}
     else {
        $$match_indicies{$index} = $new_score;
        $$match_patterns{$index} = $match_phrase;
     }
    }
   }
   $total_match_score = $total_match_score + $match_score;
   $match_total++; #data for debugging
  }
  return(($total_match_score,$match_total)); # %match_indicies is
returned implicitly...
}

MAIN BODY #handles input-output my @string;
my $word;
my $nondefflag;
my $input_string;

#my @tree_root;
my $dumpfile;
my @equivs;
my @root;
```

FIG. 3B-7

```
print "search string?\n";
while(<>){

$input_string = lc $_;
   @string = split(" ", $input_string);
   #debugging dump file
   open optOUTFILE, ">opt_test_file" or die "Can't open
opt_outfile\n";

$nondefflag = 0;
   foreach $word (@string) { #exit if non-defined words
     if(!defined($INDEX{$word})) {
       print "Word \"$word\" not defined.\n";
       $nondefflag = 1;
     }
     else {
       #add this string element to parse tree
       @equivs = split " ", $INDEX{$word};
       push @root, ($word." - ".$#equivs." equivalents");
     }
   }
   if($nondefflag == 1) {
     print "Please enter different string\n";
     next;
   } push @root, \@tree;
   &PAIR(\@tree,@string);

#   $dumpfile = Dumper(\@root); #print out tree only at end of each
branch
#   print $dumpfile;
   undef @root;
   undef @tree;

print "next string?\n";
   close optOUTFILE;

}
untie %INDEXT;
```

FIG. 3B-8

NATURAL-LANGUAGE PROCESSING SYSTEM USING A LARGE CORPUS

BACKGROUND

The present invention relates to the field of parsing and interpreting natural language text. Deciding which combinations of elements are possible in a natural language (language modeling), deciding what the syntactic relationships are between elements in a given language string (parsing), and deciding the information, or even representing the information expressed by a given natural language string (language understanding), are all fundamental and largely unsolved natural language processing problems. Current approaches can be roughly divided into symbolic, statistical, and distributional:

1) Symbolic or rule-based (rules about symbols) methods which seek to find a combination of rules which describe a given string in terms of a set of symbols.
2) Statistical methods which optimize the information over larger numbers of simple observations to make predictions about a given string.
3) Distributed or memory-based methods which keep the large numbers of simple observations and use them to define or recognize elements of natural language in terms of assemblies.

Rule-based methods keep a list of all possible relationships between all possible classes of language tokens, then at processing time they look up the tokens in a dictionary and attempt to decide which of their many possible classes, in which of many possible combinations, best describes a given string. E.g., All possible classes (dictionary):
the<-DET
Rain<-N
in<-PREP
Spain<-N
. . .

All possible relations:
NP<-DET+N
PP<-PREP+N
NP<-NP+PP
. . .

Analysis: ((The (DET)+rain (N))+(in (PREP)+Spain (N)))

The above bracketing, denoting a sequence of rule combinations, defines a dependency tree or structure between the elements, as follows, called the "parse tree":

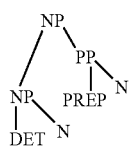

Statistical methods also keep a list of all possible relationships between all possible classes, but in they simplify model building by considering, in general, more, simpler relationships, and use statistics to summarize regularities and optimize predictions. E.g., in+Spain, on+Spain=>posit a statistical variable PREP where ("in", "on") are members of PREP and "Spain" follows PREP with probability P(PREP|"Spain"). The analysis is as with rules, but now each combination (branch of the tree) has a probability.

Distributed methods also build classes among more, simpler relationships, but they don't summarize the information. They gain in flexibility and robustness by representing classes directly in terms of collections. E.g., in+Spain, on+Spain=>posit a paradigmatic (paradigmatic-sets of alternative, as opposed to syntagmatic-sets of consecutive) vector class PREP where "in", "on" are examples of PREP and "Spain" is a component of PREP. (Or inversely, defining the vector in terms of equivalents rather than contexts, posit a vector class PREP where ("in", "on") are components of PREP, and PREP is defined as the set of all things which precede "Spain", . . . ). The analysis is as with rules, but you can have partial matches between vector classes. "Vector" is a well-known expression in natural-language processing; and for present purposes a vector may be briefly described as a list.

What distributed models gain in flexibility and robustness of representation (partial matches between classes), however, they suffer by being unwieldy to describe (sets instead of symbols), and for all their advantages in modeling static concepts there is no consensus on how they might be advantageous for modeling combinations of concepts (syntax or grammar-which is usually still done by keeping a list of all possible relationships between all possible classes).

The interesting thing about all these prior art models for language processing is that no-one has yet been able to compile a truly comprehensive list of all possible relationships between all possible classes of language tokens. And even probabilities only minimize the errors which arise from incomplete information (often called the "sparse data problem"); they don't eliminate them. The models don't quite seem to fit the problem. The present status of natural language processing might justifiably be compared with the status of artificial flight before the discovery of the airfoil.

Vectors of associative properties have become a popular method of representing the grammar and meaning of words and sometimes word sequences (U.S. Pat. No. 6,173,261 is herein incorporated by reference). But hitherto this has mainly been because of their flexibility and robustness, not generally because of their generative power. I think this power is necessary. In simple terms, the failure in accuracy of the prior art can be expressed as a failure to explain why the expression "strong tea" is preferred over the expression "powerful tea" or why we tend to say "apples and oranges" instead of "oranges and apples", "bacon and eggs", "chalk and cheese", and any one of a number of gradations of syntactive restrictiveness between these and what are recognized as errors in traditional grammar. E.g., from the literature:

It's/that's easier said than done
I'm terribly sorry to hear that
You can't believe a word he says
I see what you mean
sad to say
time of day
in advance
(verb) the un(verb)able
. . .

The issue for accurate syntax modeling is why are we comfortable, even familiar, with these examples, but less so with, say:

That is easier spoken than done
I am terribly happy to hear that
You can't believe the word he says
I see the thing you say
sad to mention
time of week
in forward Not only is the boundary subtle, but it is fuzzy (there are degrees of distinction). In a classical rule-based or statistical processor we would need a class for every such distinction (and degree of distinction). The power of combinations of examples provides a more practical solution. While we cannot imagine listing classes for each distinction, it is easy to imagine producing a unique combination of examples which distinguishes each, and which provides a fuzzy distinction. "That is easier said than done", if used often enough, can define its own class and explain itself, all the while providing elements which can form other classes and explain broader regularities in expressions of the type "That is _____ than _____", or "That _____ easier". "Strong tea" and "powerful tea" might be distinguished because the distribution of word associations associated with "strong" is different from that associated with "powerful", in detail, if not generalities.

While current distributed systems have the power to describe such subtleties of representation, they are limited by the perception that grammatical groupings represent immutable qualities, that classes are to be found not forced.

OBJECTS OF THE INVENTION

A primary object and feature of the present invention is to fulfill the above-mentioned need by the provision of a system which makes linguistic analysis distinctions based on such ad hoc collections of natural language strings existing in a repository of text or corpus. A further primary object and feature of the present invention is to provide such a system which is efficient and computer-implementable. In addition, it is a primary object and feature of this invention to provide such a system in connection with discerning the relative grammaticality of potential parses and making use of scoring systems therefor. Other objects and features of this invention will become apparent with reference to the following invention descriptions.

SUMMARY OF THE INVENTION

According to a preferred embodiment of the present invention, this invention provides a computer system, using a provided corpus of linear natural-language elements of natural language text string data in a subject language and an input string of natural-language elements in the subject language, for assisting natural-language processing, comprising, in combination: for a first adjoining pair, comprising a first pair element and a second pair element, of such natural-language elements of such input string, finding, from such string data from such corpus, a first listing of each such element syntactically equivalent to such first pair element and a second listing of each such element syntactically equivalent to such second pair element; from matching each such first-listing element with each such second-listing element, making a matched-pairs third listing by finding which matched pairs of said matching are found in such string data from such corpus; and for such matched pairs of such matched-pairs third listing, finding, from such string data from such corpus, a fourth listing of each fourth such natural-language element syntactically equivalent to any such matched pair of said third listing. It further provides such a system further comprising scoring each such natural-language element of such fourth listing, such scoring comprising counting the number of occurrences of each such natural-language element of such fourth listing in such string data from such corpus. And it provides such a system further comprising, for such fourth natural-language elements of such fourth listing, finding, from such string data from such corpus, a fifth listing of each such natural-language element syntactically equivalent to any such fourth natural-language element.

Moreover, it provides such a system further comprising scoring each such natural-language element of such fifth listing, such scoring comprising counting the number of occurrences of each such natural-language element of such fifth listing in such string data from such corpus, and it provides such a system further comprising, for such nth natural-language elements of such nth listing, finding, from such string data from such corpus, an (n+1)th listing of each such natural-language element syntactically equivalent to any such nth natural-language element. It also provides such a system further comprising scoring each such natural-language element of such (n+1)th listing, such scoring comprising counting the number of occurrences of each such natural-language element of such (n+1)th listing in such string data from such corpus. Also, it provides such a system further comprising: for a second adjoining pair, comprising such first adjoining pair as a second first pair element and another natural-language element adjoining such first adjoining pair as a second second pair element, of such natural-language elements of such input string, finding, from such string data from such corpus, a second first listing of each such element syntactically equivalent to such second first pair element and a second second listing of each such element syntactically equivalent to such second second pair element; from matching each such second first-listing element with each such second second-listing element, making a matched-pairs second third listing by finding which matched pairs of said matching are found in such string data from such corpus; and for such matched pairs of such matched-pairs second third listing, finding, from such string data from such corpus, a second fourth listing of each second fourth such natural-language element syntactically equivalent to any such matched pair of such second third listing. And it provides such a system further comprising scoring each such natural-language element of such fourth listing, such scoring comprising counting the number of occurrences of each such natural-language element of such fourth listing in such sting data from such corpus. Even further, this invention provides such a system further comprising: for an (n+1)th adjoining pair, comprising such nth adjoining pair as an (n+1)th first pair element and another natural-language element adjoining such nth adjoining pair as an (n+1)th second pair element, of such natural-language elements of such input string, finding, from such string data from such corpus, an (n+1)th first listing of each such element syntactically equivalent to such (n+1)th first pair element and an (n+1)th second listing of each such element syntactically equivalent to such (n+1)th second pair element; from matching each such (n+1)th first-listing element with each such (n+1)th second-listing element, making a matched-pairs (n+1)th third listing by finding which matched pairs of said matching are found in such string data from such corpus; and for such matched pairs of such matched-pairs (n+1)th third listing, finding, from such string data from such corpus, an (n+1)th fourth listing of each (n+1)th fourth such natural-language element syntactically equivalent to any such matched pair of such (n+1)th third listing. And it provides such a system further comprising scoring each such natural-language element of such (n+1)th fourth listing, such scoring comprising counting the number of occurrences of each such natural-language element of such (n+1)th fourth listing in such string data from such corpus. It also provides such a system according to such steps first set out in this summary, further comprising: repeating such steps while considering such original first adjoining pair as a new first pair element in such repeating, such original fourth listing as a new first listing in such repeating, and a new natural-language element adjoining, in such input string, such new first pair element as a new second pair element, thereby providing a new first adjoining pair, thereby providing a new fourth listing in association with such new first adjoining pair. And it provides such a system further comprising: re-performing the just-above steps while considering such new first adjoining pair as a first replacement first pair element in such re-performing, such new fourth listing as a first replacement first listing in such re-performing, and a further new natural-language element adjoining, in such input string, such first replacement first pair element as a first replacement second pair element, thereby providing a first replacement first adjoining pair, thereby providing a first replacement fourth listing in association with such first replacement first adjoining pair. Also it provides such a system further comprising: further continuing to perform, for such entire input string, such just-above steps while considering such nth first adjoining pair as an (n+1)th replacement first pair element in such further performing, such nth fourth listing as an (n+1)th replacement first listing in such further performing, and a further new natural-language element adjoining, in such input string, such (n+1)th replacement first pair element as an (n+1)th replacement second pair element, thereby providing an (n+1)th replacement first adjoining pair, thereby providing an (n+1)th replacement fourth listing in association with such (n+1)th replacement first adjoining pair.

Additionally, this invention provides such a system further comprising: for an (n+1)th adjoining pair, comprising such nth adjoining pair as an (n+1)th first pair element and another natural-language element adjoining such nth adjoining pair as an (n+1)th second pair element, of such natural-language elements of such input string, finding, from such string data from such corpus, an (n+1)th first listing of each such element syntactically equivalent to such (n+1)th first pair element and an (n+1)th second listing of each such element syntactically equivalent to such (n+1)th second pair element; from matching each such (n+1)th first-listing element with each such (n+1)th second-listing element, making a matched-pairs (n+1)th third listing by finding which matched pairs of said matching are found in such string data from such corpus; and for such matched pairs of such matched-pairs (n+1)th third listing, finding, from such string data from such corpus, an (n+1)th fourth listing of each (n+1)th fourth such natural-language element syntactically equivalent to any such matched pair of such (n+1)th third listing. It also provides such a system further comprising: scoring each such natural-language element of such (n+1)th fourth listing, such scoring comprising counting the number of occurrences of each such natural-language element of such (n+1)th fourth listing in such string data from such corpus; wherein said scoring comprises a similarity measure for statistical similarity between such scored natural-language element and such string data from such corpus; and wherein such scores for each such natural language element of such (n+1)th fourth listing are essentially added to determine a scoring for a string comprising such (n+1)th replacement first adjoining pair. And it provides such a system wherein such computer system is applied to possible ordered string subcombinations of at least two potential parses of such natural-language elements of such input string and a highest such scoring among such potential parses is used to determine maximum grammaticality among such potential parses. And it provides such a system wherein said scoring comprises a similarity measure for statistical similarity between such scored natural-language element and such string data from such corpus; and, further, wherein such scoring of each such fourth list element comprises: the product of a measure of statistical similarity between each such element (of such first listing) syntactically equivalent to such first pair element and such first pair element; a measure of statistical similarity between each such element (of such second listing) syntactically equivalent to such second pair element and such second pair element; a measure of statistical association between such first and second pair elements; and a measure of statistical similarity between each matched pair of such matched-pairs third listing and each fourth such natural-language element of such fourth listing; and the sum of each such product for each such third list element.

Even moreover, according to a preferred embodiment thereof, this invention provides a computer system, using a provided corpus of linear natural-language elements of natural language text string data in a subject language and an input string, to be parsed, of natural-language elements in the subject language, for assisting natural-language parsing, comprising, in combination: for each of at least two natural-language input subcombinations which are potential subparses of such input string, building an equivalence list of all corpus strings syntactically equivalent to such each input string subcombination; from such equivalence lists, in different orders for each potential parse of said input string, building to a final equivalence list for each such potential parse of such input string; and from the number and quality of entries in each respective such final equivalence list, scoring the grammaticality of such respective potential parse; and, further, wherein such scoring comprises essentially adding scores for each such entry to obtain a score for such potential parse.

Yet in addition, in accordance with a preferred embodiment thereof, this invention provides a computer system, using a provided corpus of linear natural-language elements of natural language text string data in a subject language and an input string of natural-language elements in the subject language, for assisting natural-language processing, comprising, in combination: for a first adjoining pair, comprising a first pair element and a second pair element, of such natural-language elements of such input string, finding, from such string data from such corpus, a first listing of each such element syntactically equivalent to such first pair element and a second listing of each such element syntactically equivalent to such second pair element; and from matching each such first-listing element with each such second-listing element, making a matched-pairs third listing by finding which matched pairs of said matching are found in such string data from such corpus; wherein at least one of said first adjoining pair comprises at least a pair of natural-language elements; and, further, wherein at least one of such first pair element and such second pair element comprises at least a pair of words. And it provides such a system wherein each such pair element comprises at least one word; and, further, wherein each such pair element comprises at least two words.

Also, according to a preferred embodiment thereof, it provides a computer-readable medium (for a computer system, using a provided corpus of linear natural-language elements of natural language text string data in a subject language and an input string of natural-language elements in the subject language, for assisting natural-language processing) whose contents cause a computer system to determine a grammatical parse by: for each of at least two natural-language input subcombinations which are potential subparses of such input string, building an equivalence list of all corpus strings syntactically equivalent to such each input string subcombination; from such equivalence lists, in different orders for each potential parse of said input string, building to a final equivalence list for each such potential parse of such input string;

and from the number and quality of entries in each respective such final equivalence list, scoring the grammaticality of such respective potential parse.

Even further, according to a preferred embodiment thereof, this invention provides a computer-implemented natural-language system (for a computer system, using a provided corpus of linear natural-language elements of natural language text string data in a subject language and an input string of natural-language elements in the subject language, for assisting natural-language processing) comprising: for each of at least two natural-language input subcombinations which are potential subparses of such input string, means for building an equivalence list of all corpus strings syntactically equivalent to such each input string subcombination; means for building, from such equivalence lists, in different orders for each potential parse of said input string, to a final equivalence list for each such potential parse of such input string; and means for scoring, from the number and quality of entries in each respective such final equivalence list, the grammaticality of such respective potential parse.

BRIEF DESCRIPTION OF THE DRAWINGS

FIG. 3 illustrates an example of an implementation of the instant system in the Perl programming language.

Table 1-1 illustrates the nature of data on which the system bases its natural language processing decisions, i.e., raw unannotated text, usually as part of a large corpus.

Table 1-2 illustrates a list of words and word groups contained in such a text in the contexts they occur with in that text (here the context is limited to one preceding word and one following word)

Table 1-3 illustrates a list of words and word groups in context from that text, sorted alphabetically according to that context they occur with in that text.

Table 1-4 illustrates a list of words and word groups in that text indexed by the prior and following word contexts they occur with in that text.

Table 1-5 illustrates observed word and word group similarity Table, i.e., list of words and word groups which occur in common prior and following word contexts in that text, indexed on each other, and scored by a measure of similarity between the words according to the number of common contexts they occur with in the reference text.

Table 1-6 illustrates a line from observed word and word group similarity Table with actual similar words and word groups replaced or indexed by post numbers for easier matching.

Table 2-1 illustrates matches between entries in the word and word group similarity Table for "the" and "rain".

Table 2-2 illustrates recombination of Table entries for matched pairs to synthesize a Table entry for "the rain".

Table 2-3 illustrates matches between entries in the word and word group similarity Table for "in Spain".

Table 2-4 illustrates recombination of Table entries for matched pairs to synthesize a Table entry for "in Spain".

Table 2-5 illustrates matches between entries in the word and word group similarity Table for "(the rain)" and "(in Spain)".

Table 2-6 illustrates recombination of Table entries for matched pairs to synthesize a Table entry for "(the rain) (in Spain)".

DETAILED DESCRIPTION OF A PREFERRED EMBODIMENT AND THE BEST MODE OF PRACTICE

Figure 1A:
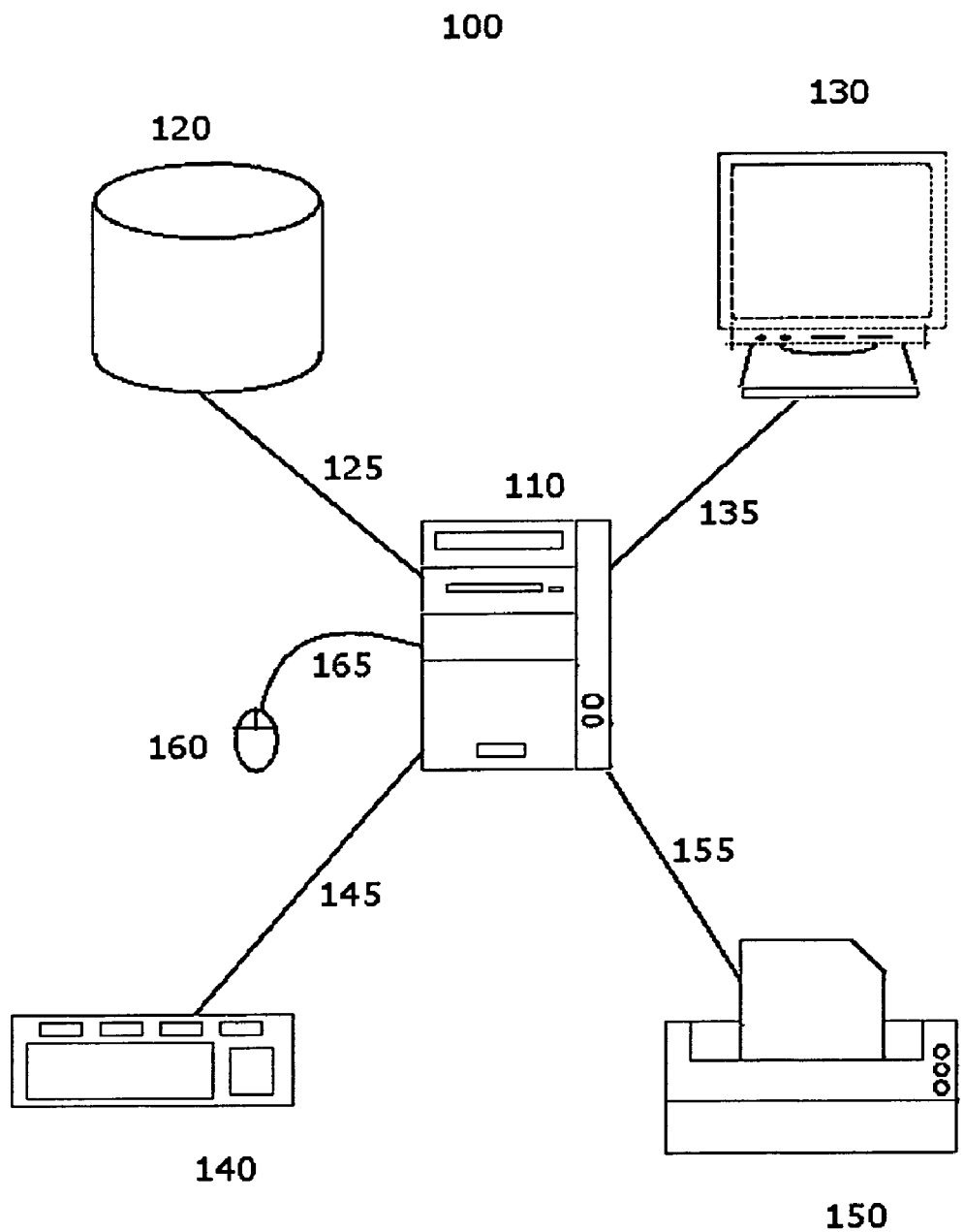
FIG. 1a illustrates the well-known components of a typical computer system.

FIG. 1(a) shows a computer system 100 that can be utilized to implement the present invention. Computer system 100, as illustrated, includes a normally-cased computer processor 110. Computer system 100 also includes a data storage unit 120, a monitor 130, keyboard 140, printer 150, and mouse 160. In the state of the art of digital processing there will continue to be changes and improvements in processing units, storage units, etc., and this progress should not restrict the future implementations of embodiments of the invention using such different or future units.

Figure 1B:
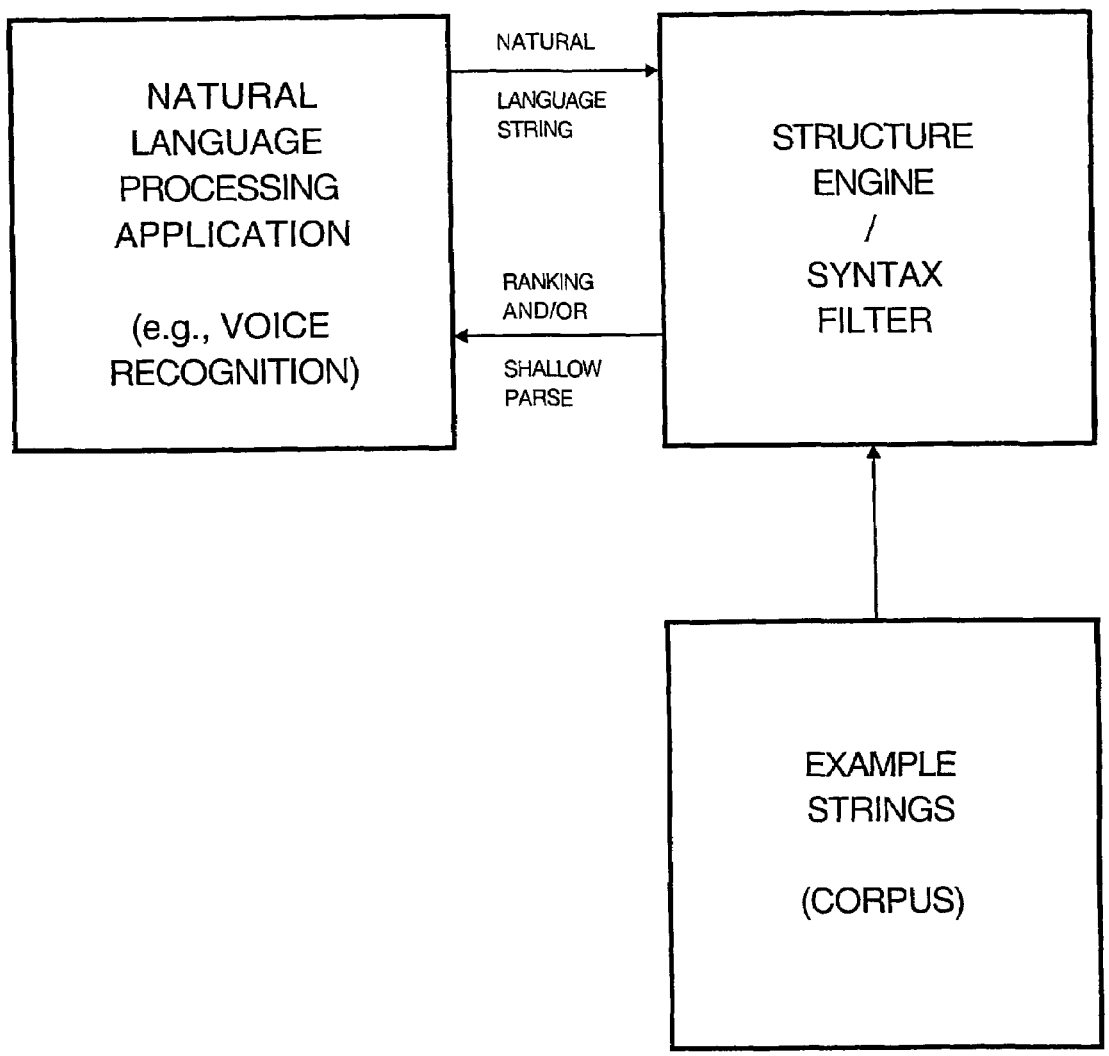
FIG. 1b illustrates an outline of a parser or a language understanding system
Figure 2A:
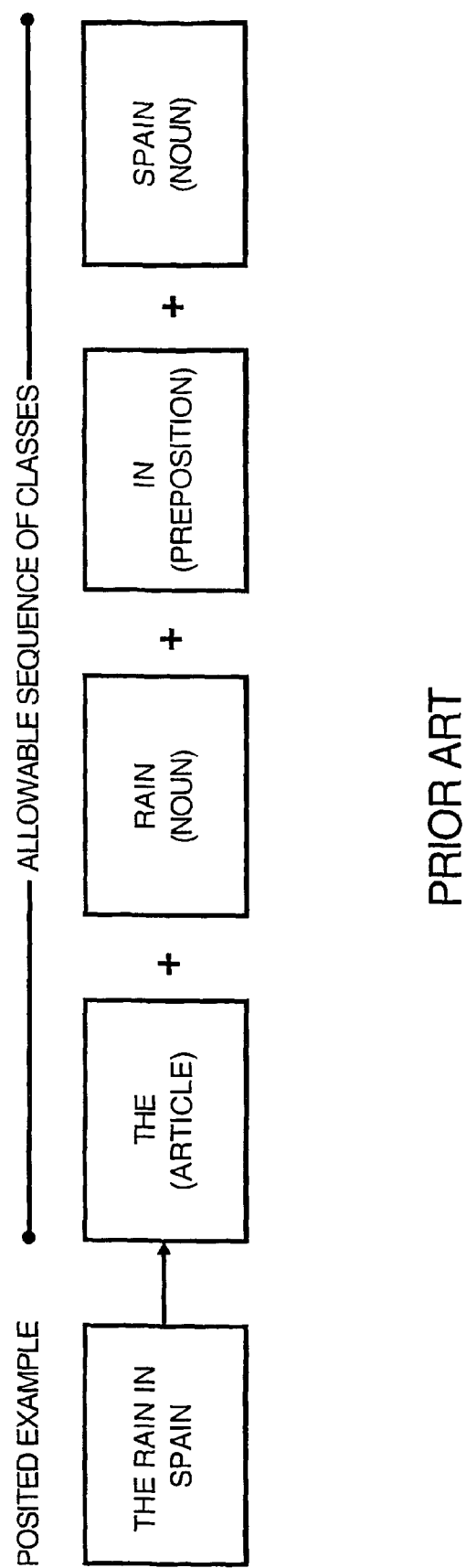
FIG. 2a illustrates a grammar as allowable sequences among a finite set of word classes.
Figure 2B:
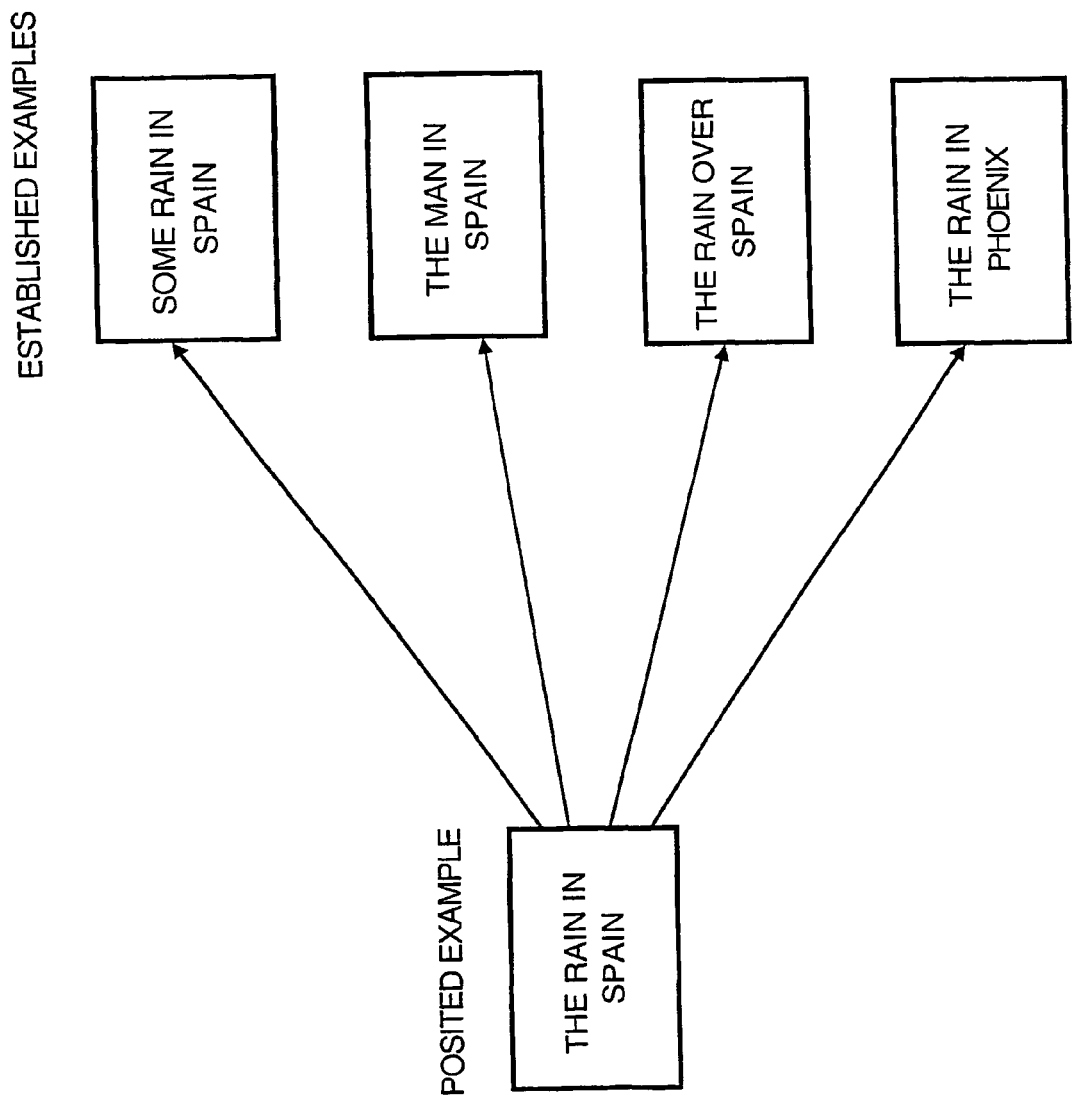
FIG. 2b illustrates a grammar as a vector of interchangeable strings (one general paradigm of the instant system).

A simple rule based system relying on a listing of possible sequences of classes for all possible classes of all possible linguistic tokens is shown schematically in FIG. 2a. In this model "The rain in Spain" is considered an acceptable string of natural language for the purposes of applications such as those described in FIG. 1b if there exists a dictionary and a set of rules such that a class can be found in the dictionary for each word in a posited string, in an order considered acceptable by the set of rules in the processor. FIG. 2b shows the style of grammatical representation used in this method, stylized here as a "vector" representation of grammar. A posited string is grammatical because there are many similar established or observed strings, the elements or the entirety of which occurs in common paradigmatic contexts (same preceding and following words). This invention provides an improvement to current vector or distributed systems based on the supposition that the essential mechanism of language processing is the recombination of paradigmatic sets language elements (letters, words etc.) making up a distributed representation of grammar to create new distributed or vector classes for each novel string or sequences of words with which the system is presented.

Figure 4:
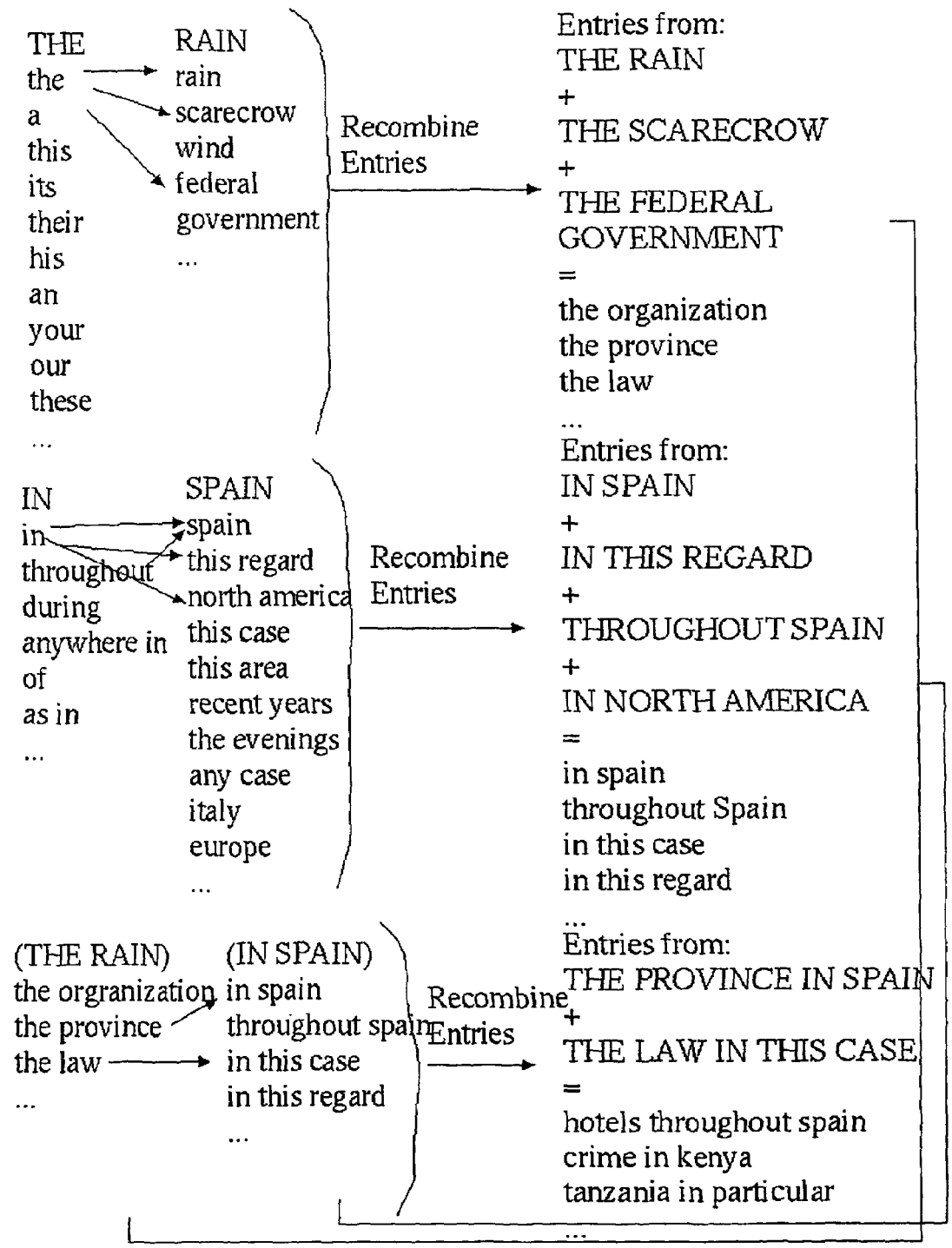
FIG. 4 illustrates a worked example of the "forcing function" (paradigmatic analogy) forcing a reassociation of strings to represent the string "the rain in Spain" (in this case the best scoring sequence of associations only is shown).

By recombination I mean that the elements of vectors representing observed natural language strings are recombined to estimate vectors representing unobserved natural language strings. This recombination of vector elements to create new vectors associated with novel combinations gives this system a new power to describe idiosyncracies of linguistic association over and above the prior art of symbolic, statistical, or other vector distribution based methods. By power I mean that paradigmatic vectors of word combinations can be combined to give other vectors which also describe (slightly different) word combinations. E.g. If we add "over" to the vector ("in", "on") we get a new vector ("over", "in", "on") which combines fine with a word like "Spain" but alters the fit of the class as a whole with a word like "due" ("over due"), and if we remove "on" from the same class we get another ("over", "in"), which works slightly differently from "on" (we can group "on" with "about") and so on. Each of these vectors will be slightly different in terms of the syntactic property it models. The system described here differs from the prior vector distribution of word association art in that it harnesses the power of elements of vectors to be recombined to create new vectors. It is not only a vector model but a recombinatorial vector model. It is also a preferred feature that these recombinations of paradigmatic vectors (sets of equivalents) are "forced" by sequences of syntagmatic matches between elements of paradigmatic vectors representing the "class" of each word or word sequence, as calculated from lists of examples beforehand, or produced from the last recombination of processing (E.g. FIG. 4 "The rain in Spain")*. The size and "goodness of fit" of these "forced" classes is the essence of the principle of grammaticality and syntax (the thing which controls possible combinations, and the order or hierarchy of combination) which is an underlying feature herein.

The described system is mainly implemented as a parser, but with the correspondence to the conceptual classes of vector information retrieval it might be seen as a language understanding system, where the representation of the meaning of a presented sentence is the produced vector of similar words. In this, it is quite similar to the vectors of similar words or word associations which are used in many current vector information retrieval applications (e.g. Schuetze U.S. Pat No. 5,675,819).

Summarizing: processing seeks to find, in a sense, a "resonance", or new grammatical regularity ("class"), between the presented string and sets of observed associations embodied in a word and word group similarity Table. Central is the creation new perspectives from existing information: recombination. The underlying concept may also be thought of as that of a "perspective generator". Dagan et al's publications on the analogous estimation of probabilities for unobserved pairs between words is the closest work known to this applicant (See *Similarity-Based Models of Word Cooccurence Probabilities*, Ido Dagan et al., *Machine Learning*, 34:43-69 (1999)). While there they match sets of words (where by "match" I mean find observed pairs between a set of words with similar associative properties to one word, and a set of words with similar associative properties to another) to generate analogous pairs in some similar ways as the matches which are used to force sets of recombinations here, they do not recombine vectors associated with sets of these analogous pairs to define new, vector, grammatical elements, and they do not use these vectors, iteratively, to generate new vectors defining a phrase structure and representing a meaning for entire strings.

The detailed elements of processing are as follows. With reference to FIG. 1, the system takes data of example strings from a corpus of text and creates a Table of word and word group similarity between words in that corpus. This Table is used by the system to interpret natural language text for some Natural Language Processing application such as a speech recognition engine, a parser, a grammar checker, a search engine, and so forth. The application sends the string to be analyzed to the system and the system returns an analysis or interpretation of that Natural Language string with reference to the data in the corpus. For instance the inputs and the outputs of the system can be:

Inputs:
1. The string or sentence to be "recognized" (parsed, analyzed or interpreted).
2. A Table of word (or other linguistic unit) associations and similarities. These Tables are much like those calculated by Dekang Lin (An Information-Theoretic Definition of Similarity. Proceedings of International Conference on Machine Learning, Madison, Wis., July, 1998), and others. With the difference that (at least) word pairs are also related to other pairs and/or single words (this is necessary for parsing and the representation of arbitrarily long strings with shorter strings). In general these Tables can be derived directly from distributions of word associations in flat, unannotated text.

Outputs:
1. A "class", a new entry for the word similarity Table, derived from a collection of similar words filtered by a sequence of pairings. This new entry represents the "grammar" of the presented string.

The order of paradigmatic matches, where at least some match elements contain one or more language elements, which produces the biggest or best such class gives a "parse tree" for the string. This is shown in the embodiment described here by the order of bracketing in the head string of the new entry in the word similarity Table. FIG. 3A gives pseudocode for an algorithm to implement the method. The steps of the code are shown conceptually in FIG. 4. They are as follows.

Given the Input:
String to be analyzed: "The rain in Spain"

A Word and Word String Similarity Table with at Least Entries:
THE|the, a, this, its, their, his, an, your, our, these . . .
RAIN|rain, scarecrow, wind, federal government . . .
IN|in, throughout, during, anywhere in, of, as in . . .
SPAIN|Spain, this regard, North America, this case, this area, recent years, the evenings, any case, Italy, Europe . . .
THE RAIN|the organization, the province . . .
THE SCARECROW| . . .
THE FEDERAL GOVERNMENT|the law . . .
IN SPAIN| . . .
IN THIS REGARD|in this regard, in this case . . .
THROUGHOUT SPAIN|throughout Spain, in Spain . . .
IN NORTH AMERICA|. . .
THE PROVINCE IN SPAIN|hotels throughout Spain, crime in Kenya . . .
THE LAW IN THIS CASE|Tanzania in particular . . .

The system will give an output of the form of a new entry in the word and word string similarity Table: ((the rain)(in Spain))|hotels throughout Spain, crime in Kenya, Tanzania in particular . . . (where the bracketing of the head string for the new entry gives the "parse" structure of the analysis).

The steps to produce this new Table entry are (as shown in FIG. 4):
1. Match elements of entry for "the" and entry for "rain", i.e., we sift between all possible combinations of the words and word strings similar to "the" and "rain", as expressed in the Table made from our original data text (corpus) to find analogous pairs which are observed (they are actually found in the text on which the word and word similarity Table is based, and there was enough text to generate a Table entry for them.) For the purposes of this example let us say we find matches: "the rain", "the scarecrow", "the Federal Government", . . .

1a. Create a new Table entry for the pair "(the rain)" by recombining elements from the Table entries of these matches, i.e., entries from: THE RAIN+THE SCARECROW+THE FEDERAL GOVERNMENT . . .

Let's say we find these to be: the organization, the province, the law . . . We now have a new Table entry: (the rain)|the organization, the province, the law . . . Note that if our analysis string was just "the rain" then processing would now be over and the size and strength (see scoring below) of the matched class would be a measure of the grammaticality of the presented combination "the rain". This may be compare this with Dagan's work where they average the probability of matched analogous pairs to estimate a probability for an unobserved pair. The grammatical definition given here i.e. that grammaticality is based on the strength/similarity/quality of elements in a vector of similar elements to that string might be seen as a basis for the accuracy of their probability estimates (accurate to the extent that probability is dependent on grammar and meaning alone).

2. Match elements of entry for "in" and entry for "Spain"

For the purposes of this example say we get matches: "in Spain", "in this regard", "throughout Spain", "in North America", . . .

2a) Create a new Table entry for the pair "(in Spain)" by recombining elements from the Table entries of these matches, i.e., entries from: IN SPAIN+IN THIS REGARD+THROUGHOUT SPAIN+IN NORTH AMERICA . . . Let's say we find those to be: in Spain, throughout Spain, in this case, in this regard . . . We now have another new Table entry: (in Spain) I in Spain, throughout Spain, in this case, in this regard . . .

3. Match elements of (newly created) entry for "(the rain)", and (newly created) entry for "(in Spain)". For this example I have listed these to be: the province in Spain, the law in this case . . .

3a. Create a new Table entry for the pair "((the rain) (in Spain))" by recombining elements from the Table entries of these matches, here entries from: THE PROVINCE IN SPAIN+THE LAW IN THIS CASE . . . In the example figure (FIG. 4), I have these as: hotels throughout Spain, crime in Kenya, Tanzania in particular, . . . We now have a new Table entry: ((the rain) (in Spain))|hotels throughout Spain, crime in Kenya, Tanzania in particular . . . This new Table entry can be considered to be a grammatical representation of the string "the rain in Spain", and the bracketing structure of its head string gives the parse structure it is associated with (the order of pairing needed to produce it):

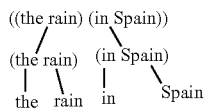

Which can be compared to a rule-based parse of the kind:

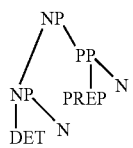

The difference is that the "classes" (NP, PP, DET, N, PREP) are now fuzzy, robust, flexible, sets or vectors, and the validity of the parse as a whole is based on a fuzzy, robust, flexible measure, the size and strength of the synthesized class for "((the rain) (in Spain))". In contrast to symbolic classes this can represent any degree of restriction, from strict collocational habit (e.g. "easier said than done") to broad grammatical generalizations (e.g. words like "easier"+words like "said" c.f. ADJ+V). This differs from previous distributed methods in that we can now have an enormous number of such classes, one for each possible string in the language. Classes do not exist to be identified but are perspectives to be found, some "resonating" more strongly than others. The size or strength, the "resonance" of that class is recognized to be the basis of a concept of grammaticality. The principle of syntax is that these perspectives are found by forcing new recombinations of paradigmatic vectors according to syntagmatic combinations.

As to scoring, of course the method of forcing recombinations will give more new entries than the "correct" or "best path" one, given in the above example. In fact it will produce a new word and word string similarity Table for every sequence of combination of initial elements into one final pair, i.e., (the (rain (in Spain)))|???
(the ((rain in) Spain))|???
((the rain) (in Spain))|???
((the (rain in)) Spain)|???
(((the rain) in) Spain) ???

Figure 5:
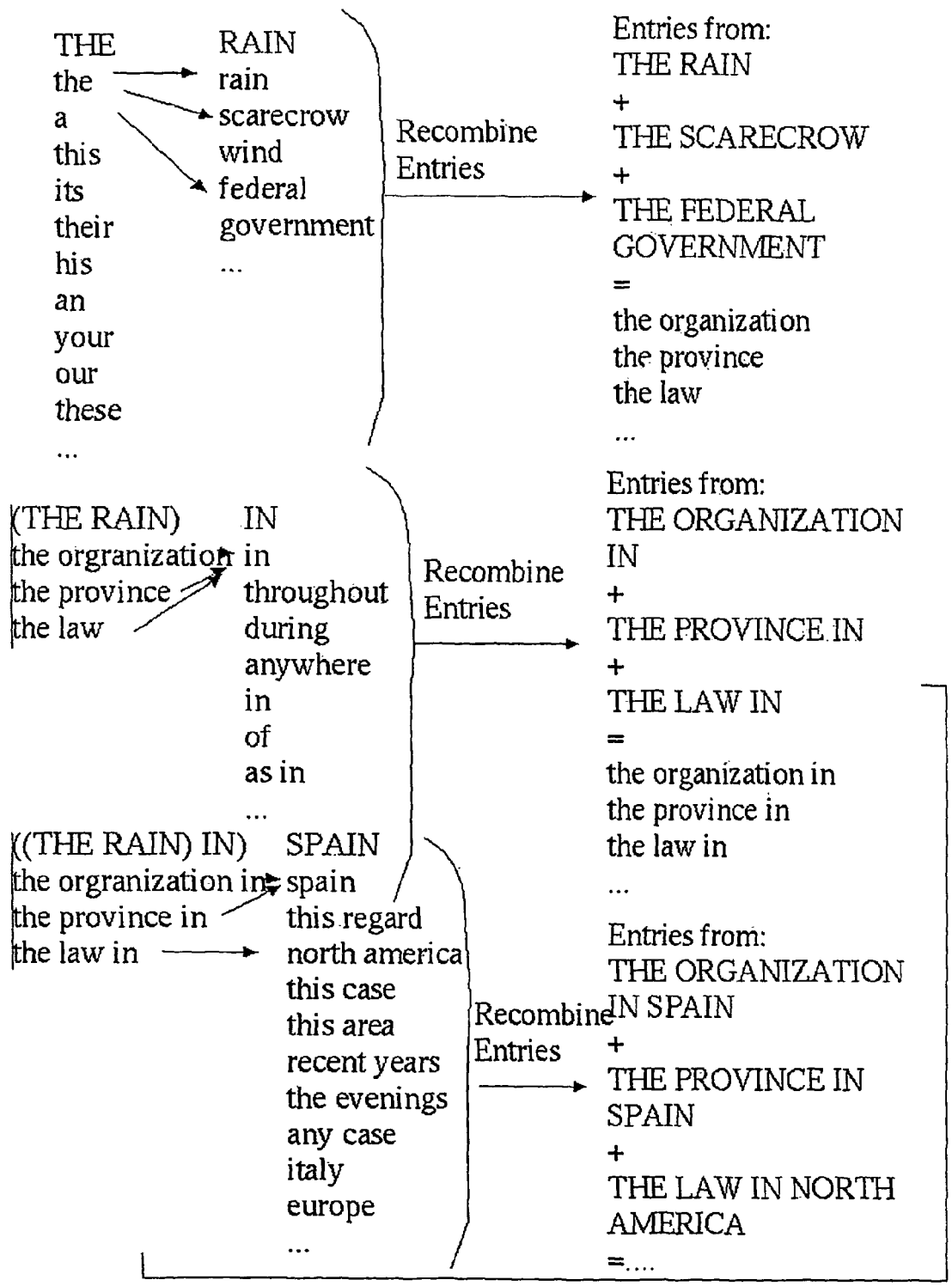
FIG. 5 illustrates a worked example of paradigmatic analogy forcing a non-best case association of strings to represent the string "the rain in Spain" (note that most matches are exact equivalents, there is no generalization to equivalent strings. In general bad sequence matches will be trivial, and thus not result in the largest match sets=scores).

A sequence of matches leading to a non-best case association of strings is shown in FIG. 5. Note that most matches are exact equivalents, there is no generalization to equivalent strings. It is the greater power of generalization of "strong" structural elements (intuitively reasonable) which is important in determining structure. They will tend to generalize better to strings of different lengths (e.g. "anywhere in" will also be equal to "in", as well as "somewhere in". In general bad sequence matches will be trivial, and thus not result in the largest match sets=scores.

The Table entry which provides the best analysis, or parse for the input string is decided by a scoring mechanism on the synthesized Table entry. Currently the scoring function I use is to take the simple sum of an estimated similarity values for each member of the new Table entry. This can be thought of as measuring the "goodness of fit" between the order of combinations to produce the new entry and the data in the rest of the word and word string similarity Table representing the syntax of the whole language.

Essentially the concept of parse is based on the comparison (for each triplet of language elements):

((go with) her)->((??) her). . . etc. substituting the first pair (go with) with "syntactically similar" equivalents or (go (with her)->(go (??)). . . etc. substituting the last pair (with her) with "syntactically similar" equivalents Whether we consider the first order of pairings is "more grammatical" than the second order of pairings depends on how many associations we can find in the data with equivalents of the first pair compared with equivalents of the second pair (or how "dense" the associated group of equivalents are, where density is defined according to the convolution of statistical association measures mentioned above). Note that in the current implementation similarity scores for the recombined entries are calculated from the weighted mutual information between matched words (similarity first word×similarity second word×mutual information between them). It may be under some circumstances be preferable to use a simple ratio of observed to possible matches to represent the goodness of fit between the match words, and provide a value for the similarity score. Note also, the observed similarity scores calculated in the original word similarity Table are based on immediate word association contexts. It may be useful to use broader context or other similarity measures. The interaction of the system with the corpus data is shown step-by-step in detail in Tables 1-1 to 1-6. This processing can all occur "off line" to speed processing on a serial computer.

Table 1-1 shows a short segment of raw text from a corpus to give an idea of the form, if not the size of such a corpus.

TABLE 1-1

... lets see what would get you there then leaving probably the seventh from San Jose or San ...

This text has been normalized by removing all capitalization, punctuation, and placing separate sentences on separate lines. To calculate an initial word and word group similarity Table to provide sets of "equivalent" words and word groups as used in the example in FIGS. 4 and 5, the system first segments all the text in the format of Table 1-1 to create a list of all words and word groups (up to a given length, in this embodiment, length 3) in a context of the word which precedes the word group and the word which follows the word group. A complete list of such segments for the short extract from a corpus given in Table 1-1 is shown in Table 1-2.

TABLE 1-2

List of Word Groups in Context:
lets see&what&would get
lets see&what would
lets see what
see what&would&get you
see what&would get
see what would
what would&get&you there
what would&get you
what would get
would get&you&there then
would get&you there
would get you
get you&there&then leaving
get you&there then
get you there
you there&then&leaving probably
you there&then leaving
you there then
there then&leaving&probably the
there then&leaving probably
there then leaving
then leaving&probably&the seventh
then leaving&probably the
then leaving probably
leaving probably&the&seventh from
leaving probably&the seventh
leaving probably the
probably the&seventh&from San
probably the&seventh from
probably the seventh
the seventh&from&San Jose
the seventh&from San
the seventh from
seventh from&San&Jose or
seventh from&San Jose
seventh from San
from San&Jose San
from San&Jose or
from San Jose
...

The system has taken the first 5 words of the extract and listed a word group consisting of the second the third and the forth, joined together to make one group in the context of the first and the fifth words, and a word group consisting of the second and third, joined together to make one group in the context of the first and the fourth, and a word group consisting only of the second word in the context of the first and third. It then lists a similar set of all possible words and word groups in context for the second 5 words of the extract, starting at the second word and extending to the sixth, so the words and word groups in context consist of the third, fourth and fifth words in the extract, joined together to make one group in the context of the second and sixth word, and the third and forth word in the context of the second and fifth, the third in the context of the second and fourth etc. The complete group of all such possible divisions for the short extract from a corpus shown in Table 1-1 is given in Table 1-2. In practice the system generates all possible such divisions for the whole corpus of text on which the natural language processing decisions are to be based. Table 1-3 shows an excerpt from such a list calculated for an entire corpus of extracts such as that shown in Table 1-1, sorted alphabetically on the context of first and last words and contracted so that each unique word and word group in a given context is shown only once, with the number of times it occurred in the entire corpus written as a number preceding it.

TABLE 1-3

Sorted Word Group In Context List:
6 up an&hour/\ a
8 up for a
10 up having a
8 up in a
7 up onδ&as a
8 up sometimes&international&takes a
7 up to&you a
7 up with a
8 up after&tomorrow&how about
8 up to ah
9 up between airlines
8 up give&me&an airport
9 up here&nine&forty am
8 up give&me an
6 up an&hour and
9 up their and
6 up time&um&ok and
9 up to&new&york and
8 up to&one&eighteen and
11 up your&profile and
9 up and&I apologize
8 up or are
7 up onδ as
6 up right at
8 up right away
9 up and&that&would be
6 up everythingll be
15 up to be
9 up you&know before
7 up a bit
9 up the&they call
8 up if&I&had called
8 up with&whatever&we can
7 up on delta
9 up the&itinerary&oh do
8 up what&rate do
7 up for&reticket&I dont
7 up they dont
8 up to&one eighteen
8 up to&uh&to fairbanks
6 up everythingll&be&just fine For instance, the word group "an hour and" is shown in Table 1-3 as having occurred 6 times in the context of the preceding word "up" and following word "a" in the entire corpus of text on which processing in this case is to be based. Similarly the word "for" has been found to occur 8 times in this context, "after tomorrow how" to occur 8 times in the context of "up" and "about", and "between" to occur 9 times between "up" and "airlines". Table 1-4 shows the same information in a different format with all the words and word groups which occur in a given context, indexed on that context.

TABLE 1-4

Common Context Table:
up_a| an&hour&and#6 for#8 having#10 in#8 onδ&as#7 sometimes&international&takes#8 to&you#7 with#7
up_about| after&tomorrow&how#8
up_ah| to#8
up_airlines| between#9
up_airport| give&me&an#8
up_am| here&nine&forty#9
up_an| give&me#8
up_and| an&hour#6 their#9 time&um&ok#6 to&new&york#9 to&one& eighteen#8
your&profile#11
up_apologize| and&I#9
up_are| or#8
up_as| on&delta#7
up_at| right#6
up_away| right#8
up_be| and&that&would#9 everythingll#6 to#15
up_before| you&know#9
up_bit| a#7
up_call| the&they#9
up_called| if&I&had#8
up_can| with&whatever&we#8
up_delta| on#7
up_do| the&itinerary&oh#9 what&rate#8
up_dont| for&reticket&I#7 they#7
up_eighteen| to&one#8
up_fairbanks| to&uh&to#8
up_fine| everythingll&be&just#6 right&away&thats#8
up_first| his&profile#7 your&profile#7
up_flight| the#18 with&a&united#7
up_for| a&reservation#8 an&order#9 and&I&apologize#9 the&profile#18
up_forty| here&nine#9 to&ah&one#8
up_four| to&nine&thirty#7
up_front| at&the#6
up_gonna| whether&thats#10
up_got| between&airlines&ive#9 here&ok&ive#8
up_great| yeah#9
up_had| if&I#8 ok&now&I#9
up_high| pretty#8
up_him| the&profile&for#9
up_hour| an#6

So we can see that the words and word groups "an hour and", "for", "having", "in", "on delta as", "sometimes international takes", "to you", and "with" all occurred in the context of "up" preceding and "a" following in this corpus of text with the "frequency" or number of times of 6, 10, 7, 8, 7, and 7 respectively. Information of this kind (common occurrence of words and word groups in context) is what the natural language processing decisions of the system are based on. In Table 1-5 each word and word group extracted from the corpus in Table 1-2 is indexed on each other word or word group with a similarity score based on the number of common contexts these words and word groups have been found to have in Table 1-4.

TABLE 1-5 an&hour&and#15| an&hour&and#1.00
for#2245| was#0.03 ah#0.02 at#0.01 if#0.03 in#0.03 is#0.02 ok#0.02 on#0.07 so#0.02 uh#0.02 going&to&be#0.03 like#0.03 what#0.01 with#0.03 and#0.01 but#0.03 for#1.00 get#0.02 thats#0.02 its#0.03 this&is#0.02
having#80| having#1.00
in#2530| was#0.02 at#0.02 in#1.00 is#0.04 on#0.05 to#0.01 uh#0.01 whats#0.04 returning&on#0.03 what#0.02 with#0.03 back#0.02 and#0.02 but#0.02 would&be#0.02 for#0.03 thats#0.02 its#0.01
onδ&as#7| onδ&as#1.00
sometimes&international&takes#8| sometimes&international&takes#1.00
to&you#124| to&you#1.00
with#878| in#0.03 on#0.02 with#1.00 for#0.03

The similarity score may be calculated by a number of standard statistical measures, of which one is the "mutual information". Mutual information is commonly calculated between all kinds of events (here the standard measure is applied and events are taken to be occurrences of a word or word group in a given context, if two words or word groups have a high mutual information, and one occurs in a given context, then you expect the other to too, i.e. they are similar). Mutual information between two words or word groups here is calculated as "the square of the number of common occurrences of two words and word groups in the whole corpus divided by the number of occurrences of each separately". Thus Table 1-5 gives an extract from a Table of words and word groups indexed on similar words and word groups according to the mutual information calculated from their common contexts shown in Table 1-4. Another such similarity score is given by the ratio of Shannon information: 2×Information(common features of word1 and word2)/Information(features word1 only)+Information(features word2 only). (See Dekang Lin—An Information-Theoretic Definition of Similarity. Proceedings of International Conference on Machine Learning, Madison, Wis., July, 1998).

The interaction of the system with the input string exchanged with the natural language processing application in FIG. 1b is shown step-by-step in Tables 2-1 to 2-6. The sequence of steps parallels that shown diagrammatically in FIG. 4. The essence of processing is to create a new "ad hoc" class, or "resonance" for each presented string. The program starts with a Table (words and word pairs indexed to similar words) and seeks to use the similarities between words in the Table itself to synthesize new entries (from new combinations of existing entries). E.g., if we find a pair "I go" in the input, but don't have any entry for it in the index, we look at all the words similar to "I" and all the words similar to "go" and see if we can use entries for pairs between those (maybe "he goes"...) to substitute for a genuine "I go" entry. That is all, though it does it for many pairs.

For use in the code shown in this implementation the Table of word and word group similarity like Table 1-5 now has actual words and word groups substituted with sequences of position numbers for words and word groups relative to each other, and looks a little like this (German words "aas", "abhang", and pair "aber&und" in the basic format: "word1 similar_word1_position-1, score_value similar_word_position_2,score_value ... "):

TABLE 1-6

...
aas| 1290,0.02 6761,0.02 13734,0.02 22306,0.02 22310,0.02 22324,
0.02 22332,0.02 35767,0.02
abhang| 9638,0.12
aber&und| 610,1.00 715,1.00
...

Note: where for "abhang" "9638" is a "word_position" for an equivalent to "abhang", and "0.12" is the similarity score of that equivalent. The "word_position" is the position assigned to all the words and word groups which can result in matches which are in the word and word group similarity Table. Using this instead of the words themselves helps us search for new pairs in the index more efficiently. E.g., if "the week" is the first entry in the word and word group similarity Table we might assign position numbers 1 to "the" and 2 to "week". If "the decision" is the 232nd entry we might add a position number 232 to all occurrences in the word and word group similarity Table of "the" and 233 to all occurrences of "decision". The word and word group similarity Table is referred to in the code as the "Index Table" because of these indices.

The search for matches is shown in FIG. 3B-4 under the comment "this is where the actual match takes place". Using relative position numbers of elements of any possible match to a pair which occurs as a word and word group similarity Table entry means the actual match algorithm can be as efficient as simply reading the position number indices of words in position one of the prospective match into an associative array and then looking up positions of words in position two in this array. Any valid lookups are a match.

In the implementation shown in FIG. 3 there are three key functions: PAIR, MATCH, and ADD_INDICIES. PAIR is just a skeleton to print out all pairs in a string of words. MATCH in this version uses the above mentioned "word position mask" (between all the equivalent words of the first word, and all the equivalent words of the second word) to find pairs which occur in the word and word group similarity Table. ADD_INDICIES makes the new entry from matches (adding word position indices). There is also a function REDUCE in this example code, but its function is largely redundant. It is just a place to calculate a new label for the new Table entry and call the MATCH function to calculate that entry.

Table 2-1 shows a set of matches between words and word groups similar to "the" and "rain" according to similarities listed in a Table such as that in Table 1-5.

TABLE 2-1

| | | | |
|---|---|---|---|
| matched pair for match score: 0.011114 | the rain: | the#1.000000 | week#0.070000 match freq: 51 |
| matched pair for match score: 0.011076 | the rain: | the#1.000000 | decision#0.070000 match freq: 39 |
| matched pair for match score: 0.044070 | the rain: | the#1.000000 | diet#0.110000 match freq: 79 |
| matched pair for match score: 0.010392 | the rain: | the#1.000000 | plan#0.080000 match freq: 63 |
| matched pair for match score: 0.017010 | the rain: | the#1.000000 | book#0.110000 match freq: 30 |
| matched pair for match score: 0.011005 | the rain: | the#1.000000 | car#0.070000 match freq: 51 |
| matched pair for match score: 0.030560 | the rain: | the#1.000000 | world#0.070000 match freq: 193 |
| matched pair for match score: 0.010695 | the rain: | the#1.000000 | industry#0.080000 match freq: 54 |
| matched pair for match score: 0.018888 | the rain: | the#1.000000 | country#0.080000 match freq: 104 |
| matched pair for match score: 0.006221 | the rain: | the#1.000000 | year#0.050000 match freq: 111 |
| matched pair for match score: 0.159827 | the rain: | the#1.000000 | united&states#0.130000 match freq: 174 |
| matched pair for match score: 0.102826 | the rain: | the#1.000000 | soviet&union#0.100000 match freq: 121 |
| matched pair for match score: 0.014404 | the rain: | the#1.000000 | way#0.060000 match freq: 134 |
| matched pair for match score: 0.010493 | the rain: | the#1.000000 | public#0.060000 match freq: 99 |
| matched pair for match score: 0.030560 | the rain: | the#1.000000 | world#0.070000 match freq: 193 |
| matched pair for match score: 0.023341 | the rain: | the#1.000000 | us#0.070000 match freq: 447 |
| matched pair for match score: 0.008989 | the rain: | the&japanese#0.090000 | market#0.050000 match freq: 38 |
| matched pair for match score: 0.002669 | the rain: | that&the#0.070000 | group#0.060000 match freq: 8 |
| matched pair for match score: 0.001048 | the rain: | japanese#0.060000 | market#0.050000 match freq: 24 |
| matched pair for match score: 0.000852 | the rain: | japanese#0.060000 | company#0.060000 match freq: 22 |
| matched pair for match score: 0.003152 | the rain: | japanese#0.060000 | government#0.070000 match freq: 58 |
| matched pair for match score: 0.002116 | the rain: | other#0.070000 | party#0.050000 match freq: 17 |
| matched pair for match score: 0.001135 | the rain: | other#0.070000 | day#0.050000 match freq: 9 |

For instance, Table 2-1 shows that the system has found a match between an equivalent to "rain" of "week", with score 0.07 (i.e. mutual information between "rain" and "week" if they were listed in Table 1-5) and the trivial equivalence of "the" to itself (with mutual information 1.0). This match is then in its turn scored according to the mutual information of the matched pair "the week". This mutual information, the same formula, but measuring a different coincidence from that used to calculate word and word group similarities in the word similarity relating processes above, calculates the "strength" of the match, i.e. given "the" how likely is it to be followed by "week". In Table 2-1 "match freq." is the "frequency" or number of occurrences of the word pair in the corpus, in the case of "the week" this is 51 for the corpus on which this calculation was based. This is squared and divided by the overall number of occurrences of "the" and "week" in the corpus to calculate an mutual information value ("$mi" in the code example given in FIG. 3B). The method then calculates a score for the match based on the product of this mutual information, the "similarity" given in a Table like that of Table 1-5 of "the" with itself, the similarity given in a Table like that of Table 1-5 of "rain" with "week and a simple numeric factor to keep scores from getting too small (in the code example of FIG. 3B-6 this is 10000). This scoring calculation can be seen in the code in FIG. 3B-6: $match_score=10000*$mi*$next_h_score*$next_p_score;

This score for the example match for "the rain" between "the" and "week" shown in Table 2-1 is given in the Table as 0.011114. Each of the matches between equivalents for "the" and "rain" has such a score. For the match between word equivalents "the plan", "the" has word similarity score 1.0, "plan" has word similarity score 0.08, and the product to give $match_b_score above gives a match score 0.010392. For the match between word equivalents "other day" near the bottom of Table 2-1 "other" has word similarity score to "the" 0.07, and "day" has word similarity score to "rain" 0.05, and the match score is 0.001135. As in FIG. 4 these matches between equivalents of "the" and "rain" are accessed in the word and word group similarity Table to synthesize an entry for "the rain" in the Table if we did not have one previously. Elements from the Table entries of the matched pairs are added together and put into the new entry. This is shown in Table 2-2.

TABLE 2-2

New element for Table entry of ( the    rain) is: "   bank" with score 0.000885
Added from entries for matched pairs:
japanese&market+japanese&company+japanese&government+other&party
New element for Table entry of ( the    rain) is: "   time" with score 0.025861
Added from entries for matched pairs:
japanese&market+japanese&government+other&party+the&week+the&decision+the&diet+
the&plan+the&book+the&car+the&world+the&industry+the&japanese&market+the&country+
the&year+the&united&states+the&soviet&union+the&way
New element for Table entry of ( the    rain) is: "   us" with score 0.007778
Added from entries for matched pairs:
japanese&market+japanese&government+other&party+other&day+the&us+the&public+the
&diet+the&world+the&japanese&market+the&group
New element for Table entry of ( the    rain) is: "   year" with score 0.000343
Added from entries for matched pairs:
japanese&market+japanese&company+japanese&government Tables 2-3 and 2-4 show the same process for the pair "(in Spain)".

TABLE 2-3

| matched pair for | in | Spain: | and#0.120000 | Europe#0.140000 match freq: 14 |
|---|---|---|---|---|
| match score: 0.004159 | | | | |
| matched pair for | in | Spain: | of#0.200000 | japan#0.100000 match freq: 60 |
| match score: 0.002157 | | | | |
| matched pair for | in | Spain: | of#0.200000 | tokyo#0.100000 match freq: 33 |
| match score: 0.002547 | | | | |
| matched pair for | in | Spain: | that#0.080000 | japan#0.100000 match freq: 76 |
| match score: 0.001720 | | | | |

TABLE 2-4

New element for Table entry of (  in    Spain) is: "   he" with score 0.000103
Added from entries for matched pairs: that&japan
New element for Table entry of (  in    Spain) is: "and&Europe" with score 0.004159
Added from entries for matched pairs: and&Europe
New element for Table entry of (  in    Spain) is: " of&japan" with score 0.002157
Added from entries for matched pairs: of&japan
New element for Table entry of (  in    Spain) is: " of&tokyo" with score 0.002547
Added from entries for matched pairs: of&tokyo
New element for Table entry of (  in    Spain) is: "   it" with score 0.000103
Added from entries for matched pairs: that&japan
New element for Table entry of (  in    Spain) is: "   there" with score 0.000086
Added from entries for matched pairs: that&japan The new word or word group similarity score, calculated directly from occurrences of common contexts in the original Table, is estimated for the element to be added in the new Table entry as the sum of products of the match score for pairs from which the new element is being added together with the existing similarity score in the word and word group similarity Table between that pair and the element to be added. This calculation is shown in the code of FIG. 3B-7 as: $new_score=$match_score*$score—and this score is added to any existing estimation of a word or word group similarity score for this element in the new Table entry—Shown in FIG. 3B-7 as:

$$match_indicies {$index}=$$match_indicies {$index}+$new_score

For instance in Table 2-2 a new element for the new Table entry for "the rain" is "bank" which is added from existing Table entries for "japanese market", "japanese company", "japanese government", and "other party", with sum of scores as the above products and sums equaling 0.000885. Similarly the new element for the new Table entry for "the rain" of "time" is added from existing Table entries for "japanese market", "japanese government", "other party", "the week", "the decision", "the diet", "the plan", "the book", etc. That is all the matches made for "the rain" which have "time" in their own word and word group similarity Table listings. The product of their existing similarity scores and the respective match scores for these contributing matches sums to 0.025861. Finally we end up with a new word and word group similarity Table entry for a potentially completely new combination of words which can be used in further matches of the same kind as that between the Table entry for "the" and "rain" shown here. Such a further or "higher order" match is shown in Table 2-5.

synthesized entry in word and word group similarity Table for "(the rain)" which was added by the previous level of word and word group similarity Table entry estimation shown above. Now it is taking part in a match to estimate new elements for the new entry in the word and word group similarity Table for the whole string "(the rain) (in Spain)" associated not only with that string, but with that order of combining elements of that string, and we see the score which we estimated as a sum of products between the match scores for the matches which had entries containing "time", and the similarities between those match elements and "time", is being used as a word and word group similarity score itself, i.e. 0.025861. This is multiplied with the similarity value for an equivalent of "(in Spain)" for this particular match, e.g. "there" with score 0.000086, and this is multiplied by the product of the scaling factor of 10000 and the mutual information between "time" and "there" occurring in that order, to give a match score for "time there" as a parameter of the estimation of a new word and word group similarity Table entry for "(the rain) (in Spain)". As at the previous level of iteration, elements are added to the new entry as a sum of scores for elements in contributing entries, where those scores are products of the existing similarity between the match pair and the element in its word and word group similarity Table entry, which is being added to the new entry, multiplied by the match score, and shown in FIG. 3B-7, as already discussed above. At the end of this stage of processing, when all elements in a string passed from the application to the method as shown in FIG. 1b have been combined by matching existing and synthesized entries for them in the word and word group similarity Table calculated from the corpus, we have a new word and word group similarity Table entry for the whole string, with a given order of combination.

TABLE 2-5 matched pair for (the rain) ( in Spain):  us#0.007778 and&Europe#0.004159 match freq: 8 match score: 0.000219
matched pair for (the rain) (in Spain):  bank#0.000885 of&japan#0.002157 match freq: 44 match score: 0.000046
matched pair for (the rain) (in Spain):university#0.000717 of&tokyo#0.002547 match freq: 11 match score: 0.000050
matched pair for (the rain) (in Spain):  time#0.025861   it#0.000103 match freq: 25 match score: 0.000000
matched pair for (the rain) (in Spain):  time#0.025861   there#0.000086 match freq: 11 match score: 0.000000
matched pair for (the rain) (in Spain):  time#0.025861   he#0.000103 match freq: 25 match score: 0.000001
matched pair for (the rain) (in Spain):  year#0.000343   he#0.000103 match freq: 24 match score: 0.000000
matched pair for (the rain) (in Spain):  year#0.000343   it#0.000103 match freq: 16 match score: 0.000000
matched pair for (the rain) (in Spain):  year#0.000343   there#0.000086 match freq: 9 match score: 0.000000

This shows elements from a set of matches between elements in the word and word group similarity Table for "(the rain)" and "(in Spain)". We can see the element "time" in the The derivation of new elements for the string and order of pairing for that string "(the rain) (in Spain)" is given in Table 2-6:

TABLE 2-6

New element for Table entry of ((the rain) (in Spain)) is:" year" with score 0.000000
Added from entries for matched pairs:
time&it#time&there#time&he#year&he#year&it#year&there
New element for Table entry of ((the rain) (in Spain)) is: " court" with score 0.000013
Added from entries for matched pairs: bank&of&japan#university&of&tokyo
New element for Table entry of ((the rain) (in Spain)) is: "us/\&Europe" with score 0.000219

TABLE 2-6-continued

Added from entries for matched pairs: us/\&Europe
New element for Table entry of ((the rain) (in Spain)) is: "   yen" with score 0.000004
Added from entries for matched pairs: bank&of&japan The system can repeat this process over all possible orders of combination of the elements in any given string passed by a natural language processing application and return synthesized Table entries for all of them. A diagrammatic representation of an alternate sequence of pair matches to create a new word and word group similarity Table entry for the presented string "the rain in Spain", in this case associated with the order of matching "((the rain) in) Spain)" is shown in FIG. 5. Notice that while the basic processes of matching and synthesizing new word and word group similarity Table entries is the same, the actual elements which are added to the new entries differ according to the order of pairing. Such a diagram can be made to represent the sequence of matches for each order of pairing possible between a like number of words. These new Table entries can be thought of as representing the grammar of the string in that order of combination. The number and value of the elements of these Table entries can be thought of as giving a measure of the grammaticality or "goodness of fit" of the presenting string, in that order of combination, with the corpus of text representing the language for the purposes of this calculation. The values of the elements of each such synthesized Table entry can be added to give a sum, and the order of matches between pairs which produces a synthesized entry with the greatest sum of entry scores can be taken as the best "parse tree" of that string in the context of the language represented by the corpus. This summing of scores for final Table entries for a string is shown in the code in FIG. 3B-2:

```
for each $entry (@parse_match_list) {
    $score = $score + 10 * ($entry - int $entry):
}
```

Notice from the Tables of matches and derived equivalents, Tables 2-1 to 2-6, that derived equivalents for pairs need not also be pairs. This is because strings of arbitrary length, up to a maximum of 3 in this embodiment, are related freely to each other, according simply to whether they occur in the same previous and following word contexts or not. Thus "the rain" in Table 2-2 is related to "bank" via word pair matches, "japanese market", "other party" etc., and the single word "time" via even three word matches such as "the soviet union", and "the united states". This means that in theory strings of arbitrary length can be represented by a word or word group similarity Table entry consisting of single words only. In Table 2-6 we see that the whole string "(the rain) (in Spain)" is represented by the single words "year", "court", and "yen", as well as the three word string "U.S. and Europe". This is possible if we have at least words and word pairs related together in the word and word group similarity Table because then matched pairs can be replaced at each level of matching by single words. Otherwise we need to keep information about combinations of words up to the full length of the string to be analyzed and meet a severe data sparseness problem.

Figure 6:
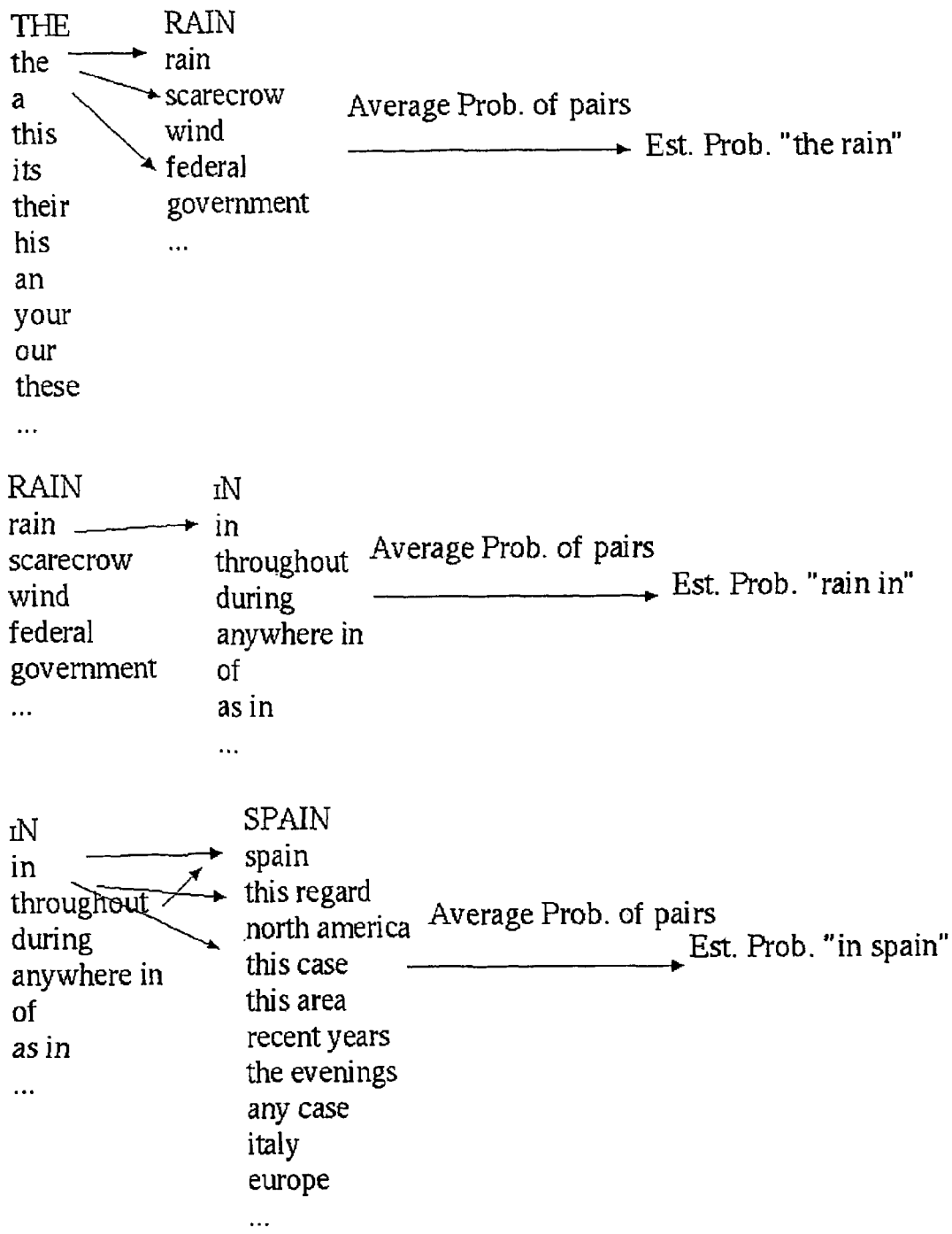
FIG. 6 illustrates a of closest art-estimation of word association probabilities between pairs of elements by paradigmatic analogy.

FIG. 6 shows a diagrammatic representation of the closest art for the estimation of a vector grammatical representation, where vector is in the sense of a vector grammatical representation in FIG. 2b, here usually referred to an "an entry in the word or word group similarity Table". In FIG. 6 matches are made between entries in a word similarity Table for unobserved pairs and those matches are used to estimate probabilities for those unobserved pairs. The sets of pairs found in the matches are not used iteratively in further matches to estimate grammatical properties for longer strings and give an order of pairing which can be associated with a parse tree, and the sum of similarity scores for the match pairs is not associated with a measure of grammaticality of the string. Also word pairs are not related to single words so that arbitrarily long strings can be represented as word and word group similarity Table entries consisting only of single words. It is also a vitally important element of the method shown in FIGS. 4 and 5 that not only words, but word pairs, or longer strings of some length, exist in the initial word and word group similarity Table and the method uses them in word pair estimations at some stage, such as the estimation of new word pair entries in FIGS. 5 and 6, because this means that the different orders of pairing will result in different final synthesized entries. This is necessary for the method to be used to construct a parse tree. Take for instance the example string "the rain in Spain". If matches between elements similar to "the" and to "rain" e.g. "the week", "the party", "other party" (Table 2-1), were used simplistically to match with similarly directly estimated equivalents for "in Spain", such as "and Europe", "of japan" (Table 2-3), and thereby estimate a vector (in the sense of FIG. 3b) to represent "the rain in Spain", then the final "vector" would have elements such as "the party and Europe", and "other party of japan". But these would also be elements of a vector representing any other order of pairwise combination, because all elements in all matched pairs would be in the initial word and word group similarity Table entries for the elements of the initial string. There could be no possible difference for the different orders of combination, and thus no possible means to differentiate a parse tree for the string. When elements from Table entries for the matched pairs rather than the matched pairs themselves are substituted, however, some matched pairs, because they are more "natural" grammatical units, will have larger word and word group similarity Table entries, and the pairing orders associated with these will have larger final word and word group similarity Table entries. They will thus indicate the more natural pairing order, or parse tree. For instance elements for the synthesized entries of "the rain" in this case, while they will also trivially include "the week", "the party", "other party", will also include "bank", "time", "U.S.", and "year" as shown in Table 2-2, and it is these which provide the matches in Table 2-5, and thus the additional elements for the new entry for "(the rain) (in Spain)" shown in Table 2-6: i.e. "year", "court", "U.S. and Europe", and "yen". It is this which distinguishes it from other possible orders of pairwise combination such as "(the rain) in) Spain)" shown in FIG. 5 according to the underlying principle of grammaticality where grammaticality is scored as the number and quality (similarity to the posited string) of elements in its synthesized word and word group similarity Table entry.

There are four important points to note about the method: Scoring a principle of grammaticality based on the number and quality (similarity to the posited string) of elements in a synthesized (recombined) entry for the posited string in the word and word group similarity Table. Recombination is the process of adding matches together to make a this new grammatical representation. It also means they can be used e.g. as elements in another match, rather than just as separate elements to be polled individually as estimators of some grammatical value, such as probability. This is also essential for both finding arbitrary levels of structure and estimating entries for longer strings using shorter strings, because both require repetition of the matching process. It is essential to have strings longer than length one in the word and word group similarity Table, and to examine different orders of pairing, for you to be able to calculate structure, or a parse tree (so you get different equivalent word lists for elements for different orders of parsing). It is essential to have longer strings related to shorter strings in the word and word group similarity Table, at least strings of length two related to strings of length one, if you do not want to have to list Table entries for arbitrarily long strings, in every order of combination, directly from the data beforehand.

Note that there are three major senses of "score" used by the method. One is the word or word group similarity score estimated directly from the text of the corpus as the mutual information of words and word groups in context or other similar statistic. This gives a measure of the similarity to two words. The second is the match score which is a product of the word or word groups similarity score for the equivalent words of a match and the mutual information of the words in the match occurring in sequence, this is a mix of the strength of the match and the similarity of the words taking part in the match to the words in the unobserved pair. This is then multiplied by the word or word group similarity score of an element being added from an entry for a match pair to the entry being synthesized for some new pair to estimate a similarity value between the element and the new pair (in FIG. 3B-6). The third major sense of score, and the most important from the grammatical point of view, is the sum of word and word group similarity values for a synthesized entry calculated for new word and word group similarity Table entries associated with each possible order of pairing of the elements of a presented string. This gives a measure of grammaticality or "goodness of fit" and can be used to select an order of pairing which is associated with a best parse tree for a string with respect to a given corpus (code for this sum in FIG. 3B-2).

As a general note on Serial vs. Parallel implementation: In the preferred embodiment here described the classes are represented as sets of similar words in a Table (where similar is defined as occurring in a common context e.g. the same immediately preceding and following word, though other contexts and other features could be used), but the relationships embodied in these Tables are more naturally expressed by networks of word associations. In fact a basic system working along the principles here described might be summarized (for a trivial case) by the network (where links show actual combinations found in a set of data):

My word and word sequence similarity Tables might be seen to be one embodiment of the observation: "A" and "The" both combine with "dog" so the syntax of "A" and "The" are linked (they are "similar" tokens). The more links there are between two words, the more likely combinations of one will also apply to the other, the more "similar" they are. And the "matching" operation which I use to force recombinations of new paradigmatic vector classes might be expressed as the analogy: "A dog", "The dog" and "The cat" contribute evidence for a new combination—"A cat" (because "A" and "The" are similar, and "The" combines with "cat). Algebraically:

$$\begin{array}{c} A \\ \searrow \\ B \\ \nearrow \\ C \\ \searrow \\ D \end{array}$$

Table: AB, CB, CD=>A|C, D|B . . .

Match: AB, CB, CD=>AD

Thus both the Tables and the match processor in the current embodiment can be seen to be equivalent to a single network of word association relations, and the match function just extends the relation one (or more) remove of distance.

With a serial computer it is more efficient to summarize the word (and easily extended to word group) similarity information of this hypothetical network in an index and perform lookups on this index to find matches, but this does not alter the underlying network nature of the method.

Although applicant has described applicant's preferred embodiments of this invention, it will be understood that the broadest scope of this invention includes such modifications as diverse computer processing and apparatus and media. Such scope is limited only by the below claims as read in connection with the above specification.

Further, many other advantages of applicant's invention will be apparent to those skilled in the art from the above descriptions and the below claims.

What is claimed is:

1. A computer system, using a provided corpus of linear natural-language elements of natural language text string data in a subject language and an input string of natural-language elements in the subject language, for assisting natural-language processing, comprising, in combination:

a) for a first adjoining pair, comprising a first pair element and a second pair element, of such natural-language elements of such input string, finding, from such string data from such corpus, a first listing of each such element syntactically related to such first pair element and a second listing of each such element syntactically related to such second pair element;

b) from matching each such first-listing element with each such second-listing element, making a matched-pairs third listing by finding which matched pairs of said matching are found in such string data from such corpus;

c) for such matched pairs of such matched-pairs third listing, finding, from such string data from such corpus, a recombined fourth listing of each fourth such natural-language element syntactically related to any such matched pair of said third listing; and d) scoring each such natural-language element of such fourth listing, such scoring comprising scoring each element, as it is related to combinations between other elements.

2. The computer system according to claim 1 further comprising:

a) for such fourth natural-language elements of such fourth listing, finding, from such string data from such corpus, a fifth listing of each such natural-language element syntactically related to any such fourth natural-language element.

3. The computer system according to claim 2 further comprising:

a) scoring each such natural-language element of such fifth listing, such scoring comprising counting the number of occurrences of each such natural-language element of such fifth listing in such string data from such corpus.

4. The computer system according to claim 2 further comprising:

a) for such nth natural-language elements of such nth listing, finding, from such string data from such corpus, an (n+1)th listing of each such natural-language element syntactically related to any such nth natural-language element.

5. The computer system according to claim 4 further comprising:

a) scoring each such natural-language element of such (n+1)th listing, such scoring comprising counting the number of occurrences of each such natural-language element of such (n+1)th listing in such string data from such corpus.

6. The computer system according to claim 1 further comprising:

a) for a second adjoining pair, comprising such first adjoining pair as a second first pair element and another natural-language element adjoining such first adjoining pair as a second second pair element, of such natural-language elements of such input string, finding, from such string data from such corpus, a second first listing of each such element syntactically related to such second first pair element and a second second listing of each such element syntactically related to such second second pair element;

b) from matching each such second first-listing element with each such second second-listing element, making a matched-pairs second third listing by finding which matched pairs of said matching are found in such string data from such corpus;

c) for such matched pairs of such matched-pairs second third listing, finding, from such string data from such corpus, a second fourth listing of each second fourth such natural-language element syntactically related to any such matched pair of such second third listing; and d) scoring each such natural-language element of such fourth listing, such scoring comprising scoring each element, as it is related to combinations between other elements.

7. The computer system according to claim 6 further comprising:

a) for an (n+1)th adjoining pair, comprising such nth adjoining pair as an (n+1)th first pair element and another natural-language element adjoining such nth adjoining pair as an (n +1)th second pair element, of such natural-language elements of such input string, finding from such string data from such corpus, an (n+1)th first listing of each such element syntactically related to such (n+1)th first pair element and an (n+1)th second listing of each such element syntactically related to such (n+1)th second pair element;

b) from matching each such (n+1)th first-listing element with each such (n+1)th second-listing element, making a matched-pairs (n+1)th third listing by finding which matched pairs of said matching are found in such string data from such corpus;

c) for such matched pairs of such matched-pairs (n+1)th third listing, finding, from such string data from such corpus, an (n+1)th fourth listing of each (n+1)th fourth such natural-language element syntactically related to any such matched pair of such (n+1)th third listing; and d) scoring each such natural-language element of such fourth listing, such scoring comprising scoring each element, as it related to combinations between other elements.

8. The computer system according to each of claim 1 further comprising:

a) repeating such steps of claim 1 while considering i. such original first adjoining pair as a new first pair element in such repeating, ii. such original fourth listing as a new first listing in such repeating, and iii. a new natural-language element adjoining, in such input string, such new first pair element as a new second pair element, thereby providing a new first adjoining pair, iv. thereby providing a new fourth listing in association with such new first adjoining pair.

9. The computer system according claim 8 further comprising:

a) re-performing steps a)i) through a)iv) of claim 8 while considering i. such new first adjoining pair as a first replacement first pair element in such re-performing, ii. such new fourth listing as a first replacement first listing in such re-performing, and iii. a further new natural-language element adjoining, in such input string, such first replacement first pair element as a first replacement second pair element, thereby providing a first replacement first adjoining pair, iv. thereby providing a first replacement fourth listing in association with such first replacement first adjoining pair.

10. The computer system according claim 9 further comprising:

a) further continuing to perform, for such entire input string, steps a)i) through a)iv) of claim 9 while considering i. such nth first adjoining pair as an (n+1)th replacement first pair element in such further performing, ii. such nth fourth listing as an (n+1)th replacement first listing in such further performing, and iii. a further new natural-language element adjoining, in such input string, such (n+1)th replacement first pair element as an (n+1)th replacement second pair element, thereby providing an (n+1)th replacement first adjoining pair,
iv. thereby providing an (n+1)th replacement fourth listing in association with such (n+1)th replacement first adjoining pair.

11. The computer system according to claim 10 further comprising:
a) for an (n+1)th adjoining pair, comprising such nth adjoining pair as an (n+1)th first pair element and another natural-language element adjoining such nth adjoining pair as an (n +1)th second pair element, of such natural-language elements of such input string, finding, from such string data from such corpus, an (n+1)th first listing of each such element syntactically related to such (n+1)th first pair element and an (n+1)th second listing of each such element syntactically related to such (n+1)th second pair element;
b) from matching each such (n+1)th first-listing element with each such (n+1)th second-listing element, making a matched-pairs (n+1)th third listing by finding which matched pairs of said matching are found in such string data from such corpus;
c) for such matched pairs of such matched-pairs (n+1)th third listing, finding, from such string data from such corpus, an (n+1)th fourth listing of each (n+1)th fourth such natural-language element syntactically related to any such matched pair of such (n+1)th third listing; and
d) scoring each such natural-language element of such (n+1)th fourth listing, such scoring comprising scoring each element, as it is related to combinations between other elements; and
e) wherein such scores for each such natural language element of such (n+1)th fourth listing are added to determine a scoring for a string comprising such (n+1)th replacement first adjoining pair.

12. The computer system according to claim 11 wherein such computer system is applied to possible ordered string subcombinations of at least two potential parses of such natural-language elements of such input string and a highest such scoring among such potential parses is used to determine maximum grammaticality among such potential parses.

13. The computer system according to each of claims 1, 3, 5, 6, 7, and 11 wherein such scoring of each such fourth list element comprises:
a) the product of
i. a statistical measure of the relationship between each such element of such first listing syntactically related to such first pair element and such first pair element;
ii. a statistical measure of the relationship between each such element of such second listing syntactically related to such second pair element and such second pair element;
iii. a statistical measure of the relationship between such first and second pair elements;
iv. a statistical measure of the relationship between each matched pair of such matched-pairs third listing and each fourth such natural-language element of such fourth listing; and
b) a sum of each such product for each same fourth list element in the list of each such third list element.

14. A computer system, using a provided corpus of linear natural-language elements of natural language text string data in a subject language and an input string, to be parsed, of natural-language elements in the subject language, for assisting natural-language parsing, comprising, in combination:
a) for each of at least two natural-language input subcombinations which are potential subparses of such input string, building a recombined list of all corpus strings syntactically related to such each input string subcombination, where the recombination of such recombined list is a paradigmatic recombination of words related by co-occurrence in sequence, representing longer strings using different paradigmatic recombinations of shorter strings;
b) from such recombined lists, in different orders for each potential parse of said input string, building to a final recombined list for each such potential parse of such input string; and
c) from the number and quality of entries in each respective such final recombined list, scoring the grammaticality of such respective potential parse.

15. The computer system according to claim 14 wherein such scoring comprises adding scores for each such entry to obtain a score for such potential parse.

16. A computer system, using a provided corpus of linear natural-language elements of natural language text string data in a subject language and an input string of natural-language elements in the subject language, for assisting natural-language processing, comprising, in combination:
a) for a first adjoining pair, comprising a first pair element and a second pair element, of such natural-language elements of such input string, finding, from such string data from such corpus, a first listing of each such element syntactically related to such first pair element and a second listing of each such element syntactically related to such second pair element; and
b) from matching each such first-listing element with each such second-listing element, making a matched-pairs third listing by finding which matched pairs of said matching are found in such string data from such corpus;
c) wherein at least one of said first adjoining pair comprises at least a pair of natural-language elements and the corresponding listing includes at least some more primitive elements, representing longer strings using different paradigmatic recombinations of shorter strings, where such recombination is a paradigmatic recombination of words related by co-occurrence in sequence.

17. The computer system according to claim 16 wherein:
a) at least one of such first pair element and such second pair element comprises at least a pair of words.

18. The computer system according to each of claims 1, 5, 6, 7-10, 11, 12 and 14-16 wherein each such pair element comprises at least one word.

19. The computer system according to each of claims 1, 5, 6, 7-10, 11, 12 and 14-16 wherein each such pair element comprises at least two words.

20. A computer-readable medium for a computer system, using a provided corpus of linear natural-language elements of natural language text string data in a subject language and an input string of natural-language elements in the subject language, for assisting in natural-language processing whose contents cause a computer system to determine a grammatical parse by:
a) for each of at least two natural-language input subcombinations which are potential subparses of such input string, building a recombined list of all corpus strings syntactically related to such each input string subcombination, where the recombination of such recombined list is a paradigmatic recombination of words related by co-occurrence in sequence, representing longer strings using different paradigmatic recombinations of shorter strings;

b) from such recombined lists, in different orders for each potential parse of said input string, building to a final recombined list for each such potential parse of such input string; and c) from the number and quality of entries in each respective such final recombined list, scoring the grammaticality of such respective potential parse.

21. A computer-implemented natural-language system for a computer system, using a provided corpus of linear natural-language elements of natural language text string data in a subject language and an input string of natural-language elements in the subject language, for assisting in natural-language processing comprising:

a) for each of at least two natural-language input subcombinations which are potential subparses of such input string, means for building a recombined list of all corpus strings syntactically related to such each input string subcombination, where the recombination of such recombined list is a paradigmatic recombination of words related by co-occurrence in sequence, representing longer strings using different paradigmatic recombinations of shorter strings;

b) means for building, from such recombined lists, in different orders for each potential parse of said input string, to a final recombined list for each such potential parse of such input string; and c) means for scoring, from the number and quality of entries in each respective such final recombined list, the grammaticality of such respective potential parse.

22. A method for finding structure in pattern recognition systems, by recombining scores of elements of vectors, lists, network associations, or other method of relating elements, where by "recombining" is meant changing scores of individual elements as they are related to combinations of other elements; and representing combinations of elements using scores of many individual elements; scoring each element as it is related to combinations between other elements.

23. The method of claim 22, for more than one of several orders of iteration of said recombination, to find a best order, if such exists, whereby the order of iteration of said recombination is meant the order of combining elements to be represented using scores of many individual elements, where "best" is defined as the highest total score of individual elements.

24. The method of claim 22, where elements are related by co-occurrence in sequence.

* * * * *